United States Patent
Nakano et al.

(10) Patent No.: US 9,559,844 B2
(45) Date of Patent: Jan. 31, 2017

(54) NON-LINEAR PROCESSOR, STREAM-CIPHER ENCRYPTING DEVICE, STREAM-CIPHER DECRYPTING DEVICE, MASK PROCESSING METHOD, STREAM-CIPHER ENCRYPTING METHOD, STREAM-CIPHER DECRYPTING METHOD, AND PROGRAM

(71) Applicant: KDDI CORPORATION, Tokyo (JP)

(72) Inventors: Yuto Nakano, Saitama (JP); Shinsaku Kiyomoto, Saitama (JP); Yutaka Miyake, Saitama (JP)

(73) Assignee: KDDI Corporation, Tokyo (JP)

( * ) Notice: Subject to any disclaimer, the term of this patent is extended or adjusted under 35 U.S.C. 154(b) by 155 days.

(21) Appl. No.: 14/357,088

(22) PCT Filed: Oct. 3, 2012

(86) PCT No.: PCT/JP2012/075704
§ 371 (c)(1),
(2) Date: May 8, 2014

(87) PCT Pub. No.: WO2013/069392
PCT Pub. Date: May 16, 2013

(65) Prior Publication Data
US 2015/0304102 A1    Oct. 22, 2015

(30) Foreign Application Priority Data

Nov. 9, 2011  (JP) .................................. 2011-245613
Jan. 24, 2012  (JP) .................................. 2012-012014

(51) Int. Cl.
*G06F 11/30*    (2006.01)
*G06F 12/14*    (2006.01)
(Continued)

(52) U.S. Cl.
CPC ............. *H04L 9/0869* (2013.01); *H04L 9/003* (2013.01); *H04L 9/065* (2013.01); *H04L 9/0668* (2013.01)

(58) Field of Classification Search
CPC .......... G06F 21/75; G06F 21/71; G06F 21/72; H04L 9/0631; H04L 9/002; H04L 9/0668; H04L 2209/04; H04L 9/0662
(Continued)

(56) References Cited

U.S. PATENT DOCUMENTS 5,703,952 A * 12/1997 Taylor .................. H04L 9/0668
380/43
2007/0230694 A1 * 10/2007 Rose ......................... G06F 7/58
380/46

(Continued)

FOREIGN PATENT DOCUMENTS

JP    2010245881 A    10/2010

OTHER PUBLICATIONS

Henricksen, et. al., "Side-channel Analysis and Countermeasures of Stream Cipher K2", IEICE Technical Report, May 14, 2010, vol. 10, No. 44, pp. 5 to 10.
(Continued)

*Primary Examiner* — Saleh Najjar
*Assistant Examiner* — Feliciano Mejia
(74) *Attorney, Agent, or Firm* — BainwoodHuang

(57) ABSTRACT

A non-linear processor, which subjects an input value from a feedback shift register storing an internal state of a stream cipher to non-linear processing to output a key stream, is connected to internal registers, which store output values from a non-linear substitution circuit which subjects the input value to non-linear substitution processing. The non-linear processor is provided with an exclusive-OR unit, which is at an input end of each of the internal registers and
(Continued)

carries out an operation of a random number generated from part of values stored in the feedback shift register and the output value of the non-linear substitution circuit to mask the output value of the non-linear substitution circuit, and another exclusive-OR unit, which is provided at an output end of the internal register and performs an operation to unmask the value stored in the internal register.

8 Claims, 15 Drawing Sheets

(51) Int. Cl.
*H04L 9/08* (2006.01)
*H04L 9/00* (2006.01)
*H04L 9/06* (2006.01)

(58) Field of Classification Search
USPC .......... 380/27, 37, 42, 44, 268, 46; 713/189
See application file for complete search history.

(56) References Cited

U.S. PATENT DOCUMENTS

| | | | |
|---|---|---|---|
| 2008/0205637 A1* | 8/2008 | Kurihara | H04L 9/085 380/28 |
| 2009/0204656 A1* | 8/2009 | Goettfert | G06F 7/584 708/252 |
| 2010/0002876 A1* | 1/2010 | Sugie | H04N 7/1675 380/42 |
| 2010/0128870 A1* | 5/2010 | Tsunoo | G06F 7/586 380/46 |
| 2010/0257373 A1 | 10/2010 | Motoyama | |

OTHER PUBLICATIONS

Henricksen, et. al., "Side-channel Analysis of the K2 Stream Cipher", pp. 1-15.
Nakano, et al., "On the Hardware Implementation of K2 Stream Cipher", The Institute of Electronics, Information and Communication Engineers 2011 Nen Sogo Taikai Koen Ronbunshu, Feb. 28, 2011, Kiso-Kyokai, A-7-5, p. 152.
Nakano, et al., "On the Hardware Implementation of K2 Stream Cipher", pp. 1-2, English Abstract.
Hibiki, et al., "Stream Ango KCipher-2 no Hardware Jisso Hyoka", Heisei 23 Nendo Tohoku-Section Joint Convention of Institutes of Electrical and Information Engineers, Japan, Aug. 25, 2011, 2C25, p. 115.
Hibiki, et al. "Stream Ango KCipher-2 no Hardware Jisso Hyoka", Heisei 23 Nendo Tohoku-Section Joint Convention of Institutes of Electrical and Information Engineers, Japan, Aug. 25, 2011, 2C25, p. 115, English Abstract.
Kiyomoto, et al., "Study of a Self-Synchronous Stream Cipher for Software Implementation", FIT2006 Dai 5 Kai Forum on Information Technology Ippan koen Ronbunshu, Aug. 21, 2006, separate vol. 4, O_001, pp. 415-416.
Kiyomoto, et al., "Study of a Self-Synchronous Stream Cipher for Software Implementation", FIT2006 Dai 5 Kai Forum on Information Technology Ippan koen Ronbunshu, Aug. 21, 2006, separate vol. 4, O_001, pp. 415-416, English Abstract.
Kiyomoto, et al., "K2: A Stream Cipher Algorithm Using Dynamic Feedback Control", pp. 1-10.

* cited by examiner

NON-LINEAR PROCESSOR, STREAM-CIPHER ENCRYPTING DEVICE, STREAM-CIPHER DECRYPTING DEVICE, MASK PROCESSING METHOD, STREAM-CIPHER ENCRYPTING METHOD, STREAM-CIPHER DECRYPTING METHOD, AND PROGRAM

This application is based on and claims the benefit of priority to (i) Japanese Patent Application No. 2011-245613, filed on Nov. 9, 2011, and (ii) Japanese Patent Application No. 2012-012014, filed on Jan. 24, 2012.

TECHNICAL FIELD

The present invention relates to a non-linear processor which masks a value during encryption or decryption processing, a stream-cipher encrypting device, a decrypting device, a mask processing method which masks data in the non-linear processor, and a program. The present invention also relates to a stream-cipher encrypting device, a stream-cipher decrypting device, a stream-cipher encrypting method, a stream-cipher decrypting method, and a program for carrying out encryption or decryption processing at high speed.

BACKGROUND ART

Today, in the information society, data encryption is essential, and encryption techniques are mounted on many devices such as smart cards. Encryption algorithms have become extremely strong, and it takes massive time and labor to directly decode that. Therefore, it can be said that data is safe as long as it is encrypted.

However, recently, side channel attacks against ciphers have become a large problem. The side channel attack is an attack in which an attacker obtains secondary information of voltage waveforms, electromagnetic waves, or the like generated from a device during encryption or decryption processing and analyzes that to recover a secret key instead of directly decoding an encryption algorithm. This attack can carry out attacking even in a case of an encryption algorithm, which is considered to be safe if it is not appropriately mounted, and there is also a big problem that it does not leave a track.

In differential power analysis (Differential Power Analysis), which is one of the side channel attacks, first, an attacker obtains voltage waveforms for many input data. Then, the value of a secret key is estimated, and a selection function is determined at the same time. The obtained voltage waveforms are sorted by using the determined selection function, and the sum of the waveforms of each group is obtained. If the value of the estimated secret key is correct, a peak shows in the waveforms. Therefore, whether it is a correct secret key or not can be distinguished, and the secret key can be restored (for example, see Non-Patent Literature 1).

In order to prevent such side channel attacks, a method that eliminates the correlation between the value during encryption or decryption processing and the secret key by masking the value during the encryption or decryption processing by a random number is effective. Therefore, generally, a circuit for generating random numbers is provided in addition to encryption algorithms, and masking is carried out by using the random numbers generated by the provided circuit.

Recently, various services using computers have been provided. In many services, encryptions are used for realizing secrecy of communication. Moreover, recently, the amount of digital data has been rapidly increased, and, at the same time, the data amount transmitted/received through networks has also increased rapidly. Therefore, the data includes personal information, confidential information of companies, etc. and the data has to be encrypted and safely transmitted/received. The most common method as an encryption method is a symmetric-key encryption method in which encryption/decryption is carried out with a single key. The symmetric-key encryption method is roughly divided into a block encryption method and a stream cipher method.

The former one is a method which is the most commonly used. However, the latter one has recently drawn attention since it is excellent in processing speed. The stream cipher is a stateful method in which encryption is carried out while updating an internal state (for example, see Non-Patent Literature 2).

CITATION LIST

Non Patent Literature

[Non-Patent Literature 1] H. Henricksen et al., "Side-Channel Analysis of the K2 Stream Cipher", ACISP2010, 2010.

[Non-patent Literature 2] Kiyomoto, Tanaka, Sakurai, "K2: A Stream Cipher Algorithm Using Dynamic Feedback Control," SECRYPT2007, 2007.

SUMMARY OF THE INVENTION

Technical Problems

However, since a circuit is additionally required in this method, the circuit size thereof is increased, and there has been a problem that it cannot be mounted on a device such as an IC card. Moreover, since a random number generating process is a comparatively heavy process, there has also been a problem that there are adverse effects on the processing speed, power consumption, etc.

Moreover, as the size of encrypted data is increased, there is also a problem that the time taken for encryption and decryption becomes long, and high-speed encryption implementation is required.

Therefore, the present invention has been accomplished in view of the above described problems, and it is an object to provide a non-linear processor which masks a value during encryption or decryption processing, a stream-cipher encrypting device, a stream-cipher decrypting device, a mask processing method, and a program without additionally providing a circuit for generating a random number used for masking the value during encryption or decryption processing.

Moreover, it is an object to provide a stream-cipher encrypting device, a stream-cipher decrypting device, a stream-cipher encrypting method, a stream-cipher decrypting method, and a program for carrying out encryption or decryption processing at high speed.

Solution to Problems (1) The present invention proposes a non-linear processor that subjects an input value from a feedback shift register (for example, corresponding to FSR-A 100A, FSR-B 100B of FIG. 1) to non-linear processing to output a key stream, the feedback shift register maintaining an internal state of a stream cipher initialized based on a secret key and an initial vector or an internal state of the stream cipher updated upon output of a key stream, the non-linear processor comprising: a non-linear substitution unit (for example, corresponding to Sub 320*a*, Sub 320*b*, Sub 320*c*, Sub 320*d* of FIG. 2) that subjects the input value to non-linear substitution processing; a plurality of internal registers (for example, corresponding to L1, L2, R1, R2 of FIG. 2) that store output values from the non-linear substitution unit; a mask processing unit (for example, corresponding to exclusive-OR operation unit 303*a* of FIG. 3) that is provided at an input end of each of the plurality of internal registers and carries out an exclusive-OR operation of a random number generated from part of values stored in the feedback shift register and the output value of the non-linear substitution unit to mask the output value of the non-linear substitution unit; and an unmasking unit (for example, corresponding to exclusive-OR operation unit 303*b* of FIG. 3) that is provided at an output end of each of the plurality of internal registers and carries out an exclusive-OR operation of the random number and the value stored in each of the plurality of internal registers to unmask the value stored in the internal register; wherein the plurality of internal registers are connected via the non-linear substitution unit, and the non-linear substitution unit carries out the non-linear substitution processing while at least using the value stored in the internal register as the input value.

According to the invention, the non-linear substitution unit carries out the non-linear substitution processing while at least using the value stored in the internal register as the input value. The plurality of internal registers are provided, are connected via the non-linear substitution unit, and store the output values from the non-linear substitution unit. The mask processing unit is provided at the input end of each of the plurality of internal registers and carries out the exclusive-OR operation of the random number generated from part of the values stored in the feedback shift register and the output value of the non-linear substitution unit to mask the output value of the non-linear substitution unit. The unmasking unit is provided at the output end of each of the plurality of internal registers and carries out the exclusive-OR operation of the random number and the value stored in each of the plurality of internal registers to unmask the value stored in the internal register. Therefore, since the random number for masking the value during encryption or decryption processing is generated from the internal state of a stream cipher, encryption can be safely executed without additionally providing the circuit for generating the random number for masking the value during encryption or decryption processing. Moreover, since the circuit for generating the random number is not additionally required, the non-linear processor can be mounted on a device such as an IC card, and influence on the processing speed, power consumption, etc. can be also reduced.

(2) The present invention proposes a non-linear processor according to the non-linear processor of (1), wherein the random number is generated from, among the values stored in the feedback shift register, a value for which randomness is ensured by update of the feedback shift register upon output of the key stream.

According to the invention, the random number is generated from, among the values stored in the feedback shift register, the value for which randomness is ensured by update of the feedback shift register upon output of the key stream. Therefore, randomness of the random number used for masking the value during encryption or decryption processing can be ensured, and safety against side channel attacks can be enhanced.

(3) The present invention proposes a non-linear processor according to the non-linear processor of (1) or (2) wherein the random number is generated by adding part of the values stored in the feedback shift register.

According to the invention, the random number is generated by adding part of the values stored in the feedback shift register. Therefore, influence on the processing speed, power consumption, etc. can be reduced without increasing a circuit size almost at all.

(4) The present invention proposes a non-linear processor according to the non-linear processor of (1) to (3), wherein the feedback shift register includes a 5-level-configuration first feedback shift register (for example, corresponding to FSR-A 100A of FIG. 1) and an 11-level-configuration second feedback shift register (for example, corresponding to FSR-B 100B of FIG. 1); and the random number is generated by adding values stored in a second level and a third level of the first feedback register and values stored in a fourth level and a tenth level of the second feedback register.

According to the invention, the feedback shift register includes the 5-level-configuration first feedback shift register and the 11-level-configuration second feedback shift register. The random number is generated by adding the values stored in the second level and the third level of the first feedback register and the values stored in the fourth level and the tenth level of the second feedback register. Therefore, the random number can be generated from the four values stored in the feedback shift register.

(5) The present invention proposes a stream-cipher encrypting device comprising: the non-linear processor of (1) to (4); an initialization processing unit (for example, corresponding to the initialization processing unit 11 of FIG. 5) that initializes the internal state based on the secret key and the initial vector and maintains the initialized state in the feedback shift register; an internal-state updating unit (for example, corresponding to the internal-state updating unit 12 of FIG. 5) that updates the internal state upon output of the key stream and maintains the updated internal state in the feedback shift register; and an encrypting unit (for example, corresponding to the encrypting unit 13 of FIG. 5) that carries out an exclusive-OR operation of the key stream output from the non-linear processor and a plaintext input from outside to output an encrypted text.

According to the invention, the encrypting device can form the encrypting device by using the non-linear processor of (1) to (4). Therefore, the encrypting device which can safely execute encryption can be formed without additionally providing a circuit for generating the random number for masking the value during encryption processing. The encrypting device which has small influence on the processing speed, power consumption, etc. and can be mounted on a device such as an IC card can be formed.

(6) The present invention proposes a stream-cipher decrypting device comprising: the non-linear processor of (1) to (4); an initialization processing unit (for example, corresponding to the initialization processing unit 11 of FIG. 6) that initializes the internal state based on the secret key and the initial vector and maintains the initialized state in the feedback shift register; an internal-state updating unit (for example, corresponding to the internal-state updating unit 12 of FIG. 6) that updates the internal state upon output of the key stream and maintains the updated internal state in the feedback shift register; and a decrypting unit (for example, corresponding to the decrypting unit 14 of FIG. 6) that carries out an exclusive-OR operation of the key stream output from the non-linear processor and an encrypted text input from outside to output a plaintext.

According to the invention, the decrypting device can form the decrypting device by using the non-linear processor of (1) to (4). Therefore, the decrypting device which can safely execute decryption can be formed without additionally providing a circuit for generating the random number for masking the value during decryption processing. The decrypting device which has small influence on the processing speed, power consumption, etc. and can be mounted on a device such as an IC card can be formed.

(7) The present invention proposes a mask processing method of masking data in a non-linear processor that subjects an input value from a feedback shift register to non-linear processing to output a key stream, the feedback shift register maintaining an internal state of a stream cipher initialized based on a secret key and an initial vector or an internal state of the stream cipher updated upon output of a key stream; wherein the non-linear processor comprises an internal register, a non-linear substitution unit that subjects the input value to the non-linear substitution processing, a mask processing unit, and an unmasking unit; and the mask processing method includes: a first step (for example, corresponding to step S1 of FIG. 4) of carrying out an exclusive-OR operation of an output value of the non-linear substitution unit and a random number generated from part of values stored in the feedback shift register by the mask processing unit to mask the output value of the non-linear substitution unit; a second step (for example, corresponding to step S2 of FIG. 4) of storing the output value of the non-linear substitution unit masked in the first step by the internal register; a third step (for example, corresponding to step S3 of FIG. 4) of carrying out an exclusive-OR operation of the value stored in the internal register in the second step and the random number by the unmasking unit to unmask the value stored in the internal register.

According to the invention, first, in the first step, the mask processing unit carries out the exclusive-OR operation of the output value of the non-linear substitution unit and the random number generated from part of the values stored in the feedback shift register to mask the output value of the non-linear substitution unit. Then, in the second step, the internal register stores the output value of the non-linear substitution unit masked in the first step. Then, in the third step, the unmasking unit carries out the exclusive-OR operation of the value stored in the internal register in the second step and the random number to unmask the value stored in the internal register. Therefore, as a result of generating the random number, which is for masking the value during encryption or decryption processing, from the internal state of the stream cipher, encryption can be safely executed without additionally providing a circuit for generating the random number, which is for masking the value during the encryption or decryption processing. Moreover, since the circuit for generating the random number is not additionally required, the non-linear processor can be mounted on a device such as an IC card, and the influence thereof on the processing speed, power consumption, etc. can be also reduced.

(8) The present invention proposes a program for causing a computer to execute a mask processing method of masking data in a non-linear processor that subjects an input value from a feedback shift register to non-linear processing to output a key stream, the feedback shift register maintaining an internal state of a stream cipher initialized based on a secret key and an initial vector or an internal state of the stream cipher updated upon output of a key stream; wherein the non-linear processor comprises an internal register, a non-linear substitution unit that subjects the input value to the non-linear substitution processing, a mask processing unit, and an unmasking unit; and the program is for causing the computer to execute: a first step (for example, corresponding to step S1 of FIG. 4) of carrying out an exclusive-OR operation of an output value of the non-linear substitution unit and a random number generated from part of values stored in the feedback shift register by the mask processing unit to mask the output value of the non-linear substitution unit; a second step (for example, corresponding to step S2 of FIG. 4) of storing the output value of the non-linear substitution unit masked in the first step by the internal register; and a third step (for example, corresponding to step S3 of FIG. 4) of carrying out an exclusive-OR operation of the value stored in the internal register in the second step and the random number by the unmasking unit to unmask the value stored in the internal register.

According to the invention, first, in the first step, the mask processing unit carries out the exclusive-OR operation of the output value of the non-linear substitution unit and the random number generated from part of the values stored in the feedback shift register to mask the output value of the non-linear substitution unit. Then, in the second step, the internal register stores the output value of the non-linear substitution unit masked in the first step. Then, in the third step, the unmasking unit carries out the exclusive-OR operation of the value stored in the internal register in the second step and the random number to unmask the value stored in the internal register. Therefore, as a result of generating the random number, which is for masking the value during encryption or decryption processing, from the internal state of the stream cipher, encryption can be safely executed without additionally providing a circuit for generating the random number, which is for masking the value during the encryption or decryption processing. Moreover, since the circuit for generating the random number is not additionally required, the non-linear processor can be mounted on a device such as an IC card, and the influence thereof on the processing speed, power consumption, etc. can be also reduced.

(9) The present invention proposes a stream-cipher encrypting device comprising: a key-sequence generating unit (for example, corresponding to the non-linear processing unit of FIG. 7) that receives input of an expanded key obtained by expanding an initial key and an initial value in initialization processing, receives input of a feedback value from a non-linear unit after the initialization processing is finished, and generates a key sequence; an input switching unit (for example, corresponding to the flip-flop 1200 of FIG. 7) that inputs the expanded key obtained by expanding the initial key and the initial value to the key-sequence generating unit in the initialization processing and, after the initialization processing is finished, inputs the feedback value from the non-linear unit to the key-sequence generating unit; an encrypted-text generating unit (for example, corresponding to the exclusive-OR operation unit 1400 of FIG. 7) that parallelly processes non-linear processing executed by the key-sequence generating, causes a non-linear function provided in the key-sequence generating unit to maintain rearranging processing and a multiplication result, which is for obtaining the feedback value, as a data table, and carries out an exclusive-OR operation of the generated key sequence and a plaintext to generate an encrypted text.

According to the invention, the key-sequence generating unit receives input of the expanded key obtained by expanding the initial key and the initial value in the initialization processing, receives input of the feedback value from the non-linear unit after the initialization processing is finished, and generates the key sequence. The input switching unit inputs the expanded key obtained by expanding the initial key and the initial value to the key-sequence generating unit in the initialization processing and, after the initialization processing is finished, inputs the feedback value from the non-linear unit to the key-sequence generating unit. The encrypted-text generating unit parallelly processes the non-linear processing executed by the key-sequence generating unit, causes the non-linear function provided in the key-sequence generating unit to maintain the rearranging processing and the multiplication result, which is for obtaining the feedback value, as a data table, and carries out the exclusive-OR operation of the generated key sequence and the plaintext to generate the encrypted text. Thus, the input switching unit inputs the expanded key obtained by expanding the initial key and the initial value to the key-sequence generating unit in the initialization processing and, after the initialization processing is finished, inputs the feedback value from the non-linear unit to the key-sequence generating unit; therefore, the delay amount of data can be prevented from being increased, and the time taken for encryption can be therefore shortened. Moreover, the non-linear processing executed by the key-sequence generating unit is parallelly processed, and the non-linear function provided in the key-sequence generating unit maintains the rearranging processing and the multiplication result, which is for obtaining the feedback value, as the data table; therefore, many processing can be multiplexed. Furthermore, since the non-linear function can carry out processing by referencing the table only once, the time taken for encryption can be shortened.

(10) The present invention proposes a stream-cipher encrypting device comprising: an initial-key expanding unit (for example, corresponding to the key expanding unit 1100 of FIG. 7) that expands an initial key; a key-sequence generating unit (for example, corresponding to the non-linear processing unit 1300 of FIG. 7) that receives input of the expanded initial key and an initial value in initial processing, receives input of a feedback value from a non-linear unit after the initialization processing is finished, and generates a key sequence; an input switching unit (for example, corresponding to the flip-flop 1200 of FIG. 7) that inputs an expanded key obtained by expanding the initial key and the initial value to the key-sequence generating unit in the initialization processing and, after the initialization processing is finished, inputs the feedback value from the non-linear unit to the key-sequence generating unit; and an encrypted-text generating unit (for example, corresponding to the exclusive-OR operation unit 1400 of FIG. 7) that parallelly processes non-linear processing executed by the key-sequence generating unit, causes a non-linear function provided in the key-sequence generating unit to maintain rearranging processing and a multiplication result, which is for obtaining the feedback value, as a data table, and carries out an exclusive-OR operation of the generated key sequence and a plaintext to generate an encrypted text.

According to the invention, the initial-key expanding unit expands the initial key. The expanded key obtained by expanding the initial key and the initial value are input in the initialization processing, the feedback value from the non-linear unit is input after the initialization processing is finished, and the key sequence is generated. The input switching unit inputs the expanded key obtained by expanding the initial key and the initial value to the key-sequence generating unit in the initialization processing and, after the initialization processing is finished, inputs the feedback value from the non-linear unit to the key-sequence generating unit. The encrypted-text generating unit parallelly processes the non-linear processing executed by the key-sequence generating unit, causes the non-linear function provided in the key-sequence generating unit to maintain the rearranging processing and the multiplication result, which is for obtaining the feedback value, as a data table, and carries out the exclusive-OR operation of the generated key sequence and the plaintext to generate the encrypted text. Thus, the input switching unit inputs the expanded key obtained by expanding the initial key and the initial value to the key-sequence generating unit in the initialization processing and, after the initialization processing is finished, inputs the feedback value from the non-linear unit to the key-sequence generating unit; therefore, the delay amount of data can be prevented from being increased, and the time taken for encryption can be therefore shortened. Moreover, the non-linear processing executed by the key-sequence generating unit is parallelly processed, and the non-linear function provided in the key-sequence generating unit maintains the rearranging processing and the multiplication result, which is for obtaining the feedback value, as the data table; therefore, many processing can be multiplexed. Furthermore, since the non-linear function can carry out processing by referencing the table only once, the time taken for encryption can be shortened.

(11) The present invention proposes the stream-cipher encrypting device according to the stream-cipher encrypting device of (9) or (10), wherein the input switching unit is a flip-flop.

According to the invention, the input switching unit is the flip-flop. Therefore, input to the key-sequence generating unit can be easily switched by inputting "0" or "1".

(12) The present invention proposes a stream-cipher decrypting device comprising: a key-sequence generating unit (for example, corresponding to the non-linear processing unit 1300 of FIG. 12) that receives input of an expanded key obtained by expanding an initial key and an initial value in initialization processing, receives input of a feedback value from a non-linear unit after the initialization processing is finished, and generates a key sequence; an input switching unit (for example, corresponding to the flip-flop 1200 of FIG. 12) that inputs the expanded key obtained by expanding the initial key and the initial value to the key-sequence generating unit in the initialization processing and, after the initialization processing is finished, inputs the feedback value from the non-linear unit to the key-sequence generating unit; a plaintext generating unit (for example, corresponding to the exclusive-OR operation unit 1400 of FIG. 12) that parallelly processes non-linear processing executed by the key-sequence generating, causes a non-linear function provided in the key-sequence generating unit to maintain rearranging processing and a multiplication result, which is for obtaining the feedback value, as a data table, and carries out an exclusive-OR operation of the generated key sequence and an encrypted text to generate a plaintext.

According to the invention, the key-sequence generating unit receives input of the expanded key obtained by expanding the initial key and the initial value in the initialization processing, receives input of the feedback value from the non-linear unit after the initialization processing is finished, and generates the key sequence. The input switching unit inputs the expanded key obtained by expanding the initial key and the initial value to the key-sequence generating unit in the initialization processing and, after the initialization processing is finished, inputs the feedback value from the non-linear unit to the key-sequence generating unit. The encrypted-text generating unit parallelly processes the non-linear processing executed by the key-sequence generating unit, causes the non-linear function provided in the key-sequence generating unit to maintain the rearranging processing and the multiplication result, which is for obtaining the feedback value, as a data table, and carries out the exclusive-OR operation of the generated key sequence and the encrypted text to generate the plaintext. Thus, the input switching unit inputs the expanded key obtained by expanding the initial key and the initial value to the key-sequence generating unit in the initialization processing and, after the initialization processing is finished, inputs the feedback value from the non-linear unit to the key-sequence generating unit; therefore, the delay amount of data can be prevented from being increased, and the time taken for encryption can be therefore shortened. Moreover, the non-linear processing executed by the key-sequence generating unit is parallelly processed, and the non-linear function provided in the key-sequence generating unit maintains the rearranging processing and the multiplication result, which is for obtaining the feedback value, as the data table; therefore, many processing can be multiplexed. Furthermore, since the non-linear function can carry out processing by referencing the table only once, the time taken for encryption can be shortened.

(13) The present invention proposes a stream-cipher encrypting device comprising: an initial-key expanding unit (for example, corresponding to the key expanding unit 1100 of FIG. 12) that expands an initial key; a key-sequence generating unit (for example, corresponding to the non-linear processing unit 1300 of FIG. 12) that receives input of the expanded initial key and an initial value in initial processing, receives input of a feedback value from a non-linear unit after the initialization processing is finished, and generates a key sequence; an input switching unit (for example, corresponding to the flip-flop 1200 of FIG. 12) that inputs an expanded key obtained by expanding the initial key and the initial value to the key-sequence generating unit in the initialization processing and, after the initialization processing is finished, inputs the feedback value from the non-linear unit to the key-sequence generating unit; and a plaintext generating unit that parallelly processes non-linear processing executed by the key-sequence generating unit, causes a non-linear function provided in the key-sequence generating unit (for example, corresponding to the exclusive-OR operation unit 1400 of FIG. 12) to maintain rearranging processing and a multiplication result, which is for obtaining the feedback value, as a data table, and carries out an exclusive-OR operation of the generated key sequence and an encrypted text to generate a plaintext.

According to the invention, the initial-key expanding unit expands the initial key. The expanded key obtained by expanding the initial key and the initial value are input in the initialization processing, the feedback value from the non-linear unit is input after the initialization processing is finished, and the key sequence is generated. The input switching unit inputs the expanded key obtained by expanding the initial key and the initial value to the key-sequence generating unit in the initialization processing and, after the initialization processing is finished, inputs the feedback value from the non-linear unit to the key-sequence generating unit. The encrypted-text generating unit parallelly processes the non-linear processing executed by the key-sequence generating unit, causes the non-linear function provided in the key-sequence generating unit to maintain the rearranging processing and the multiplication result, which is for obtaining the feedback value, as a data table, and carries out the exclusive-OR operation of the generated key sequence and the encrypted text to generate the plaintext. Thus, the input switching unit inputs the expanded key obtained by expanding the initial key and the initial value to the key-sequence generating unit in the initialization processing and, after the initialization processing is finished, inputs the feedback value from the non-linear unit to the key-sequence generating unit; therefore, the delay amount of data can be prevented from being increased, and the time taken for encryption can be therefore shortened. Moreover, the non-linear processing executed by the key-sequence generating unit is parallelly processed, and the non-linear function provided in the key-sequence generating unit maintains the rearranging processing and the multiplication result, which is for obtaining the feedback value, as the data table; therefore, many processing can be multiplexed. Furthermore, since the non-linear function can carry out processing by referencing the table only once, the time taken for encryption can be shortened.

(14) The present invention proposes the stream-cipher decrypting device according to the stream-cipher encrypting device of (12) or (13), wherein the input switching unit is a flip-flop.

According to the invention, the input switching unit is the flip-flop. Therefore, input to the key-sequence generating unit can be easily switched by inputting "0" or "1".

(15) The present invention proposes a stream-cipher encrypting method comprising: a first step (for example, corresponding to step S1101 of FIG. 11) of expanding an initial key in advance to generate an expanded key by a key expanding unit; a second step (for example, corresponding to step S1102 of FIG. 11) of inputting the generated expanded key and an initial value in the initialization processing by an initialization processing unit to carry out the initialization processing; a third step (for example, corresponding to step S1103 of FIG. 11) by a key-sequence generating unit of inputting a feedback value from a non-linear unit after the initialization processing is finished, parallelly processing non-linear processing, and maintaining and processing rearranging processing and a multiplication result, which is for obtaining the feedback value, as a data table to generate a key sequence by a non-linear function; and a fourth step (for example, corresponding to step S1104 of FIG. 11) of carrying out an exclusive-OR operation of the generated key sequence and a plaintext to generate an encrypted text by an encrypted-text generating unit.

According to the invention, the key expanding unit expands the initial key in advance to generate the expanded key, and the initialization processing unit inputs the generated expanded key and the initial value in the initialization processing to carry out the initialization processing. Then, after the initialization processing is finished, the key-sequence generating unit inputs the feedback value from the non-linear unit, parallelly processes the non-linear processing, and the non-linear function maintains and processes the rearranging processing and the multiplication result, which is for obtaining the feedback value, as the data table to generate the key sequence, and the encrypted-text generating unit carries out the exclusive-OR operation of the generated key sequence and the plaintext to generate the encrypted text. Thus, the input switching unit inputs the expanded key obtained by expanding the initial key and the initial value to the key-sequence generating unit in the initialization processing and, after the initialization processing is finished, inputs the feedback value from the non-linear unit to the key-sequence generating unit; therefore, the delay amount of data can be prevented from being increased, and the time taken for encryption can be therefore shortened. Moreover, the non-linear processing executed by the key-sequence generating unit is parallelly processed, and the non-linear function provided in the key-sequence generating unit maintains the rearranging processing and the multiplication result, which is for obtaining the feedback value, as the data table; therefore, many processing can be multiplexed. Furthermore, since the non-linear function can carry out processing by referencing the table only once, the time taken for encryption can be shortened.

(16) The present invention proposes a stream-cipher encrypting method comprising: a first step of expanding an initial key to generate an expanded key by a key expanding unit; a second step of inputting the generated expanded key and an initial value in the initialization processing by an initialization processing unit to carry out the initialization processing; a third step by a key-sequence generating unit of inputting a feedback value from a non-linear unit after the initialization processing is finished, parallelly processing non-linear processing, and maintaining and processing rearranging processing and a multiplication result, which is for obtaining the feedback value, as a data table to generate a key sequence by a non-linear function; and a fourth step of carrying out an exclusive-OR operation of the generated key sequence and a plaintext to generate an encrypted text by an encrypted-text generating unit.

According to the invention, the key expanding unit expands the initial key to generate the expanded key, and the initialization processing unit inputs the generated expanded key and the initial value in the initialization processing to carry out the initialization processing. Then, after the initialization processing is finished, the key-sequence generating unit inputs the feedback value from the non-linear unit, parallelly processes the non-linear processing, and the non-linear function maintains and processes the rearranging processing and the multiplication result, which is for obtaining the feedback value, as the data table to generate the key sequence, and the encrypted-text generating unit carries out the exclusive-OR operation of the generated key sequence and the plaintext to generate the encrypted text. Thus, the input switching unit inputs the expanded key obtained by expanding the initial key and the initial value to the key-sequence generating unit in the initialization processing and, after the initialization processing is finished, inputs the feedback value from the non-linear unit to the key-sequence generating unit; therefore, the delay amount of data can be prevented from being increased, and the time taken for encryption can be therefore shortened. Moreover, the non-linear processing executed by the key-sequence generating unit is parallelly processed, and the non-linear function provided in the key-sequence generating unit maintains the rearranging processing and the multiplication result, which is for obtaining the feedback value, as the data table; therefore, many processing can be multiplexed. Furthermore, since the non-linear function can carry out processing by referencing the table only once, the time taken for encryption can be shortened.

(17) The present invention a stream-cipher decrypting method comprising: a first step (for example, corresponding to step S1201 of FIG. 15) of expanding an initial key in advance to generate an expanded key by a key expanding unit; a second step (for example, corresponding to step S1202 of FIG. 15) of inputting the generated expanded key and an initial value in the initialization processing by an initialization processing unit to carry out the initialization processing; a third step (for example, corresponding to step S1203 of FIG. 15) by a key-sequence generating unit of inputting a feedback value from a non-linear unit after the initialization processing is finished, parallelly processing non-linear processing, and maintaining and processing rearranging processing and a multiplication result, which is for obtaining the feedback value, as a data table to generate a key sequence by a non-linear function; and a fourth step (for example, corresponding to step S1204 of FIG. 15) of carrying out an exclusive-OR operation of the generated key sequence and an encrypted text to generate a plaintext by a plaintext generating unit.

According to the invention, the key expanding unit expands the initial key in advance to generate the expanded key, and the initialization processing unit inputs the generated expanded key and the initial value in the initialization processing to carry out the initialization processing. Then, after the initialization processing is finished, the key-sequence generating unit inputs the feedback value from the non-linear unit, parallelly processes the non-linear processing, and the non-linear function maintains and processes the rearranging processing and the multiplication result, which is for obtaining the feedback value, as the data table to generate the key sequence, and the encrypted-text generating unit carries out the exclusive-OR operation of the generated key sequence and the encrypted text to generate the plaintext. Thus, the input switching unit inputs the expanded key obtained by expanding the initial key and the initial value to the key-sequence generating unit in the initialization processing and, after the initialization processing is finished, inputs the feedback value from the non-linear unit to the key-sequence generating unit; therefore, the delay amount of data can be prevented from being increased, and the time taken for encryption can be therefore shortened. Moreover, the non-linear processing executed by the key-sequence generating unit is parallelly processed, and the non-linear function provided in the key-sequence generating unit maintains the rearranging processing and the multiplication result, which is for obtaining the feedback value, as the data table; therefore, many processing can be multiplexed. Furthermore, since the non-linear function can carry out processing by referencing the table only once, the time taken for encryption can be shortened.

(18) The present invention proposes a stream-cipher encrypting method comprising: a first step of expanding an initial key in advance to generate an expanded key by a key expanding unit; a second step of inputting the generated expanded key and an initial value in the initialization processing by an initialization processing unit to carry out the initialization processing; a third step by a key-sequence generating unit of inputting a feedback value from a non-linear unit after the initialization processing is finished, parallelly processing non-linear processing, and maintaining and processing rearranging processing and a multiplication result, which is for obtaining the feedback value, as a data table to generate a key sequence by a non-linear function; and a fourth step of carrying out an exclusive-OR operation of the generated key sequence and an encrypted text to generate a plaintext by a plaintext generating unit.

According to the invention, the key expanding unit expands the initial key to generate the expanded key, and the initialization processing unit inputs the generated expanded key and the initial value in the initialization processing to carry out the initialization processing. Then, after the initialization processing is finished, the key-sequence generating unit inputs the feedback value from the non-linear unit, parallelly processes the non-linear processing, and the non-linear function maintains and processes the rearranging processing and the multiplication result, which is for obtaining the feedback value, as the data table to generate the key sequence, and the encrypted-text generating unit carries out the exclusive-OR operation of the generated key sequence and the encrypted text to generate the plaintext. Thus, the input switching unit inputs the expanded key obtained by expanding the initial key and the initial value to the key-sequence generating unit in the initialization processing and, after the initialization processing is finished, inputs the feedback value from the non-linear unit to the key-sequence generating unit; therefore, the delay amount of data can be prevented from being increased, and the time taken for encryption can be therefore shortened. Moreover, the non-linear processing executed by the key-sequence generating unit is parallelly processed, and the non-linear function provided in the key-sequence generating unit maintains the rearranging processing and the multiplication result, which is for obtaining the feedback value, as the data table; therefore, many processing can be multiplexed. Furthermore, since the non-linear function can carry out processing by referencing the table only once, the time taken for encryption can be shortened.

(19) The present invention proposes a program for causing a computer to execute a stream-cipher encrypting method comprising: a first step (for example, corresponding to step S1101 of FIG. 11) of expanding an initial key in advance to generate an expanded key by a key expanding unit; a second step (for example, corresponding to step S1102 of FIG. 11) of inputting the generated expanded key and an initial value in the initialization processing by an initialization processing unit to carry out the initialization processing; a third step (for example, corresponding to step S1103 of FIG. 11) by a key-sequence generating unit of inputting a feedback value from a non-linear unit after the initialization processing is finished, parallelly processing non-linear processing, and maintaining and processing rearranging processing and a multiplication result, which is for obtaining the feedback value, as a data table to generate a key sequence by a non-linear function; and a fourth step (for example, corresponding to step S1104 of FIG. 11) of carrying out an exclusive-OR operation of the generated key sequence and a plaintext to generate an encrypted text by an encrypted-text generating unit.

According to the invention, the key expanding unit expands the initial key in advance to generate the expanded key, and the initialization processing unit inputs the generated expanded key and the initial value in the initialization processing to carry out the initialization processing. Then, after the initialization processing is finished, the key-sequence generating unit inputs the feedback value from the non-linear unit, parallelly processes the non-linear processing, and the non-linear function maintains and processes the rearranging processing and the multiplication result, which is for obtaining the feedback value, as the data table to generate the key sequence, and the encrypted-text generating unit carries out the exclusive-OR operation of the generated key sequence and the plaintext to generate the encrypted text. Thus, the input switching unit inputs the expanded key obtained by expanding the initial key and the initial value to the key-sequence generating unit in the initialization processing and, after the initialization processing is finished, inputs the feedback value from the non-linear unit to the key-sequence generating unit; therefore, the delay amount of data can be prevented from being increased, and the time taken for encryption can be therefore shortened. Moreover, the non-linear processing executed by the key-sequence generating unit is parallelly processed, and the non-linear function provided in the key-sequence generating unit maintains the rearranging processing and the multiplication result, which is for obtaining the feedback value, as the data table; therefore, many processing can be multiplexed. Furthermore, since the non-linear function can carry out processing by referencing the table only once, the time taken for encryption can be shortened.

(20) The present invention proposes a program for causing a computer to execute a stream-cipher encrypting method comprising: a first step of expanding an initial key to generate an expanded key by a key expanding unit; a second step of inputting the generated expanded key and an initial value in the initialization processing by an initialization processing unit to carry out the initialization processing; a third step by a key-sequence generating unit of inputting a feedback value from a non-linear unit after the initialization processing is finished, parallelly processing non-linear processing, and maintaining and processing rearranging processing and a multiplication result, which is for obtaining the feedback value, as a data table to generate a key sequence by a non-linear function; and a fourth step of carrying out an exclusive-OR operation of the generated key sequence and a plaintext to generate an encrypted text by an encrypted-text generating unit.

According to the invention, the key expanding unit expands the initial key to generate the expanded key, and the initialization processing unit inputs the generated expanded key and the initial value in the initialization processing to carry out the initialization processing. Then, after the initialization processing is finished, the key-sequence generating unit inputs the feedback value from the non-linear unit, parallelly processes the non-linear processing, and the non-linear function maintains and processes the rearranging processing and the multiplication result, which is for obtaining the feedback value, as the data table to generate the key sequence, and the encrypted-text generating unit carries out the exclusive-OR operation of the generated key sequence and the plaintext to generate the encrypted text. Thus, the input switching unit inputs the expanded key obtained by expanding the initial key and the initial value to the key-sequence generating unit in the initialization processing and, after the initialization processing is finished, inputs the feedback value from the non-linear unit to the key-sequence generating unit; therefore, the delay amount of data can be prevented from being increased, and the time taken for encryption can be therefore shortened. Moreover, the non-linear processing executed by the key-sequence generating unit is parallelly processed, and the non-linear function provided in the key-sequence generating unit maintains the rearranging processing and the multiplication result, which is for obtaining the feedback value, as the data table; therefore, many processing can be multiplexed. Furthermore, since the non-linear function can carry out processing by referencing the table only once, the time taken for encryption can be shortened.

(21) The present invention proposes a program for causing a computer to execute a stream-cipher decrypting method comprising: a first step (for example, corresponding to step S1201 of FIG. 15) of expanding an initial key in advance to generate an expanded key by a key expanding unit; a second step (for example, corresponding to step S1202 of FIG. 15) of inputting the generated expanded key and an initial value in the initialization processing by an initialization processing unit to carry out the initialization processing; a third step (for example, corresponding to step S1203 of FIG. 15) by a key-sequence generating unit of inputting a feedback value from a non-linear unit after the initialization processing is finished, parallelly processing non-linear processing, and maintaining and processing rearranging processing and a multiplication result, which is for obtaining the feedback value, as a data table to generate a key sequence by a non-linear function; and a fourth step (for example, corresponding to step S1204 of FIG. 15) of carrying out an exclusive-OR operation of the generated key sequence and an encrypted text to generate a plaintext by a plaintext generating unit.

According to the invention, the key expanding unit expands the initial key in advance to generate the expanded key, and the initialization processing unit inputs the generated expanded key and the initial value in the initialization processing to carry out the initialization processing. Then, after the initialization processing is finished, the key-sequence generating unit inputs the feedback value from the non-linear unit, parallelly processes the non-linear processing, and the non-linear function maintains and processes the rearranging processing and the multiplication result, which is for obtaining the feedback value, as the data table to generate the key sequence, and the encrypted-text generating unit carries out the exclusive-OR operation of the generated key sequence and the encrypted text to generate the plaintext. Thus, the input switching unit inputs the expanded key obtained by expanding the initial key and the initial value to the key-sequence generating unit in the initialization processing and, after the initialization processing is finished, inputs the feedback value from the non-linear unit to the key-sequence generating unit; therefore, the delay amount of data can be prevented from being increased, and the time taken for encryption can be therefore shortened. Moreover, the non-linear processing executed by the key-sequence generating unit is parallelly processed, and the non-linear function provided in the key-sequence generating unit maintains the rearranging processing and the multiplication result, which is for obtaining the feedback value, as the data table; therefore, many processing can be multiplexed. Furthermore, since the non-linear function can carry out processing by referencing the table only once, the time taken for encryption can be shortened.

(22) The present invention proposes a program for causing a computer to execute a stream-cipher decrypting method comprising: a first step of expanding an initial key to generate an expanded key by a key expanding unit; a second step of inputting the generated expanded key and an initial value in the initialization processing by an initialization processing unit to carry out the initialization processing; a third step by a key-sequence generating unit of inputting a feedback value from a non-linear unit after the initialization processing is finished, parallelly processing non-linear processing, and maintaining and processing rearranging processing and a multiplication result, which is for obtaining the feedback value, as a data table to generate a key sequence by a non-linear function; and a fourth step of carrying out an exclusive-OR operation of the generated key sequence and an encrypted text to generate a plaintext by a plaintext generating unit.

According to the invention, the key expanding unit expands the initial key to generate the expanded key, and the initialization processing unit inputs the generated expanded key and the initial value in the initialization processing to carry out the initialization processing. Then, after the initialization processing is finished, the key-sequence generating unit inputs the feedback value from the non-linear unit, parallelly processes the non-linear processing, and the non-linear function maintains and processes the rearranging processing and the multiplication result, which is for obtaining the feedback value, as the data table to generate the key sequence, and the encrypted-text generating unit carries out the exclusive-OR operation of the generated key sequence and the encrypted text to generate the plaintext. Thus, the input switching unit inputs the expanded key obtained by expanding the initial key and the initial value to the key-sequence generating unit in the initialization processing and, after the initialization processing is finished, inputs the feedback value from the non-linear unit to the key-sequence generating unit; therefore, the delay amount of data can be prevented from being increased, and the time taken for encryption can be therefore shortened. Moreover, the non-linear processing executed by the key-sequence generating unit is parallelly processed, and the non-linear function provided in the key-sequence generating unit maintains the rearranging processing and the multiplication result, which is for obtaining the feedback value, as the data table; therefore, many processing can be multiplexed. Furthermore, since the non-linear function can carry out processing by referencing the table only once, the time taken for encryption can be shortened.

Effects of the Invention

According to the present invention, the value during processing can be masked without additionally providing a circuit for generating the random number used for masking the value during processing in encryption or decryption processing of a stream cipher. Moreover, since the circuit for generating the random number used for masking the value during the processing is not additionally provided, the processor can be mounted on a device such as an IC card, and influence on the processing speed, power consumption, etc. can be also reduced.

Moreover, according to the present invention, the input switching unit inputs the expanded key, which is obtained by expanding the initial key, and the initial value to the key-sequence generating unit in the initialization processing and, after the initialization processing is finished, inputs the feedback value from the non-linear unit to the key-sequence generating unit. Therefore, the delay amount of data can be prevented from being increased. Therefore, there is an advantage that the time taken for encryption can be shortened. Moreover, the non-linear processing executed by the key-sequence generating unit is parallelly processed, and the non-linear function provided in the key-sequence generating unit maintains the rearranging processing and the multiplication result, which is for obtaining the feedback value, as the data table. Therefore, many processing can be multiplexed. Furthermore, the non-linear function can carry out processing by referencing the table only once. Therefore, there is an effect that the time taken for encryption can be shortened.

DETAILED DESCRIPTION OF PREFERRED EMBODIMENTS

Hereinafter, embodiments of the present invention will be explained in detail by using drawings. Constituent elements of the present embodiments can be arbitrarily replaced with existing constituent elements, etc., and various variations including combinations with other existing constituent elements can be implemented. Therefore, the substances of the invention described in claims are not limited by the descriptions of the present embodiments.

First Embodiment

A first embodiment of the present invention will be explained by using FIG. 1 to FIG. 4.
<Configuration of Pseudorandom-Number Generator>

Figure 1:
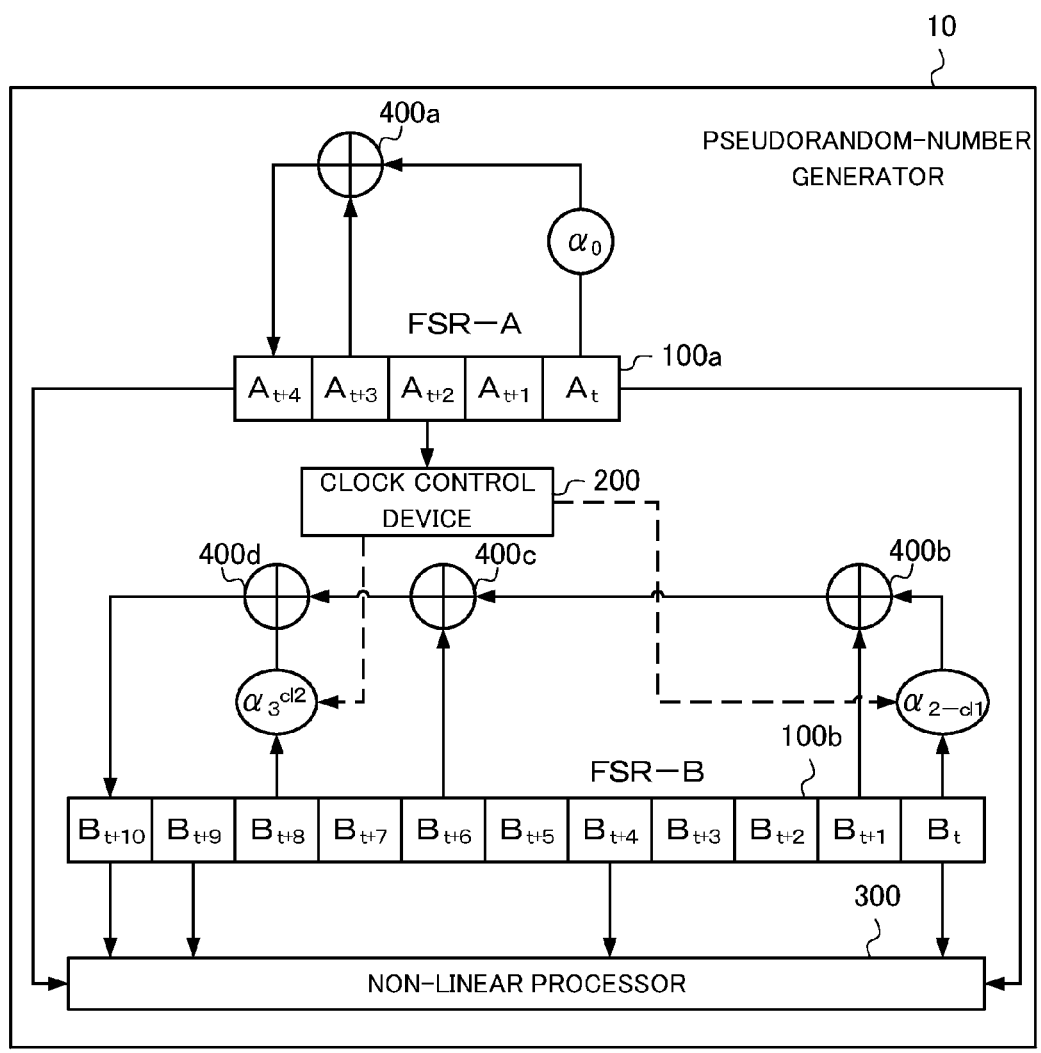
FIG. 1 is a drawing showing a configuration of a pseudorandom-number generator including a non-linear processor according to a first embodiment of the present invention.

FIG. 1 is a drawing showing a configuration of a pseudorandom-number generator 10 including a non-linear processor 300 according to the present embodiment. In the present embodiment, the pseudorandom-number generator 10 and the non-linear processor 300 of K2, which is one of stream ciphers, will be explained as an example. However, the present invention can be applied also to pseudorandom-number generators and non-linear processors of other stream ciphers.

The pseudorandom-number generator 10 generates a keystream, which is used for encrypting a plaintext or decrypting an encrypted text, based on a secret key and an initial vector. As shown in FIG. 1, the pseudorandom-number generator 10 is comprised of two feedback shift registers, FSR-A 100a and FSR-B 100b, the non-linear processor 300, a clock control device 200, and four exclusive-OR operation units 400a to d.

FSR-A 100a has 5-level registers, wherein the registers are $A_t$ to $A_{t+4}$. FSR-A 100a outputs the values required among the values stored in the register to the clock control device 200 and the non-linear processor 300, which will be described later. FSR-A 100a carries out a state transition according to a feedback function. Specifically, when FSR-A 100a outputs the values stored in $A_t$ and $A_{t+4}$ to the non-linear processor 300, each value therein is shifted to the register on the immediate right thereof. Then, FSR-A 100a stores the operation result of an exclusive-OR operation of $A_t$ and $A_{t+3}$, which is executed by the exclusive-OR operation unit 400a, in $A_t+_4$ on the extreme left.

FSR-B 100b has 11-level registers, wherein the registers are $B_t$ to $Bt_{+10}$. In FSR-B 100b, a feedback function is controlled by the clock control device 200, which receives outputs of FSR-A 100a. As well as FSR-A 100a, when FSR-B 100b outputs the values stored in $B_t$, $B_{t+4}$, $B_{t+9}$, and $B_{t+10}$ to the non-linear processor 300, FSR-B 100b also shifts each value therein to the register on the immediate right thereof. The, FSR-B100b stores the operation results of exclusive-OR operations of $B_t$, $B_{t+1}$, $B_{t+6}$, and $B_{t+8}$, which are executed by the exclusive-OR operation units 400b to d, in $Bt_{+10}$ on the extreme left.

With respect to the input value from FSR-A 100a, the clock control device 200 carries out a process of determining the feedback function of FSR-B 100b.

Figure 2:
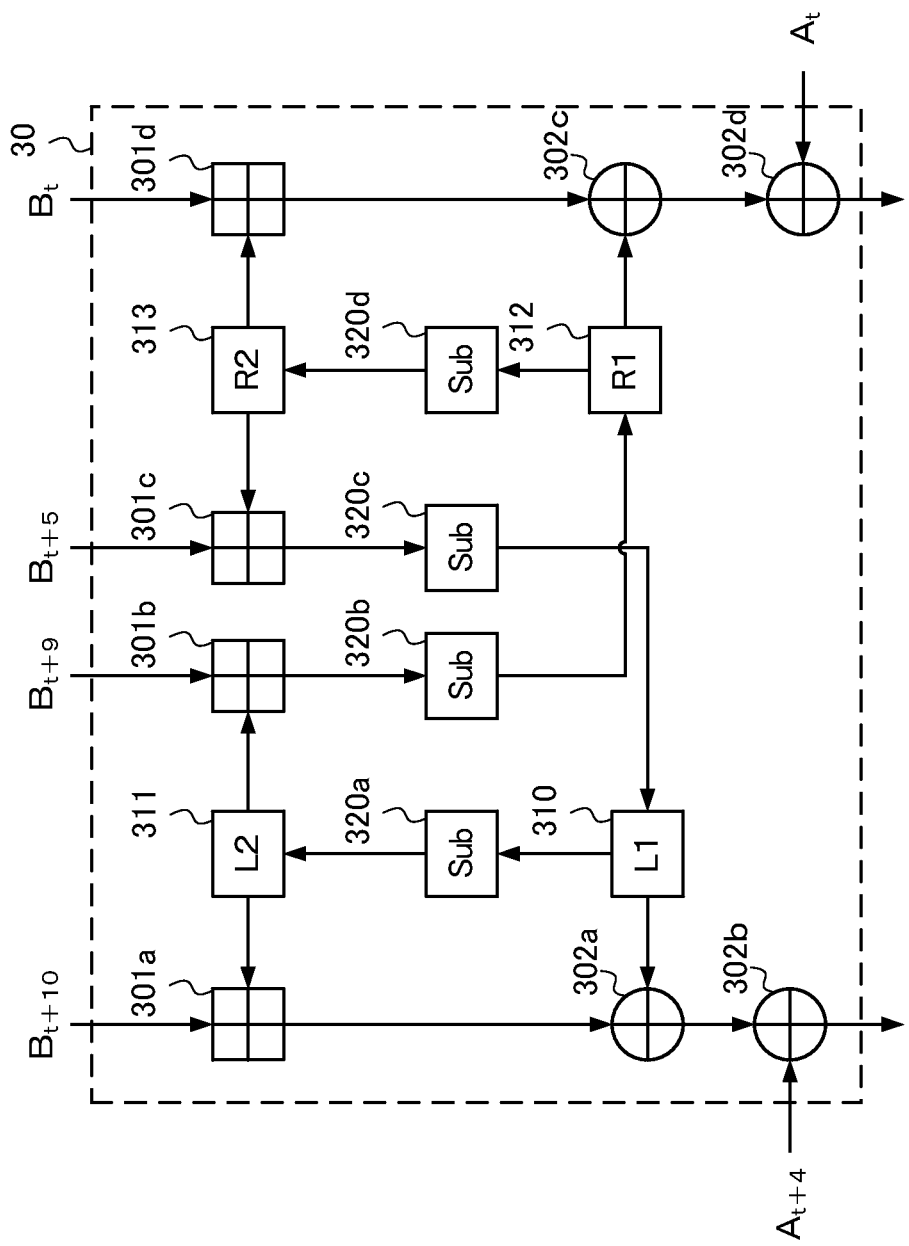
FIG. 2 is a drawing showing a configuration of a conventional non-linear processor.
Figure 3:
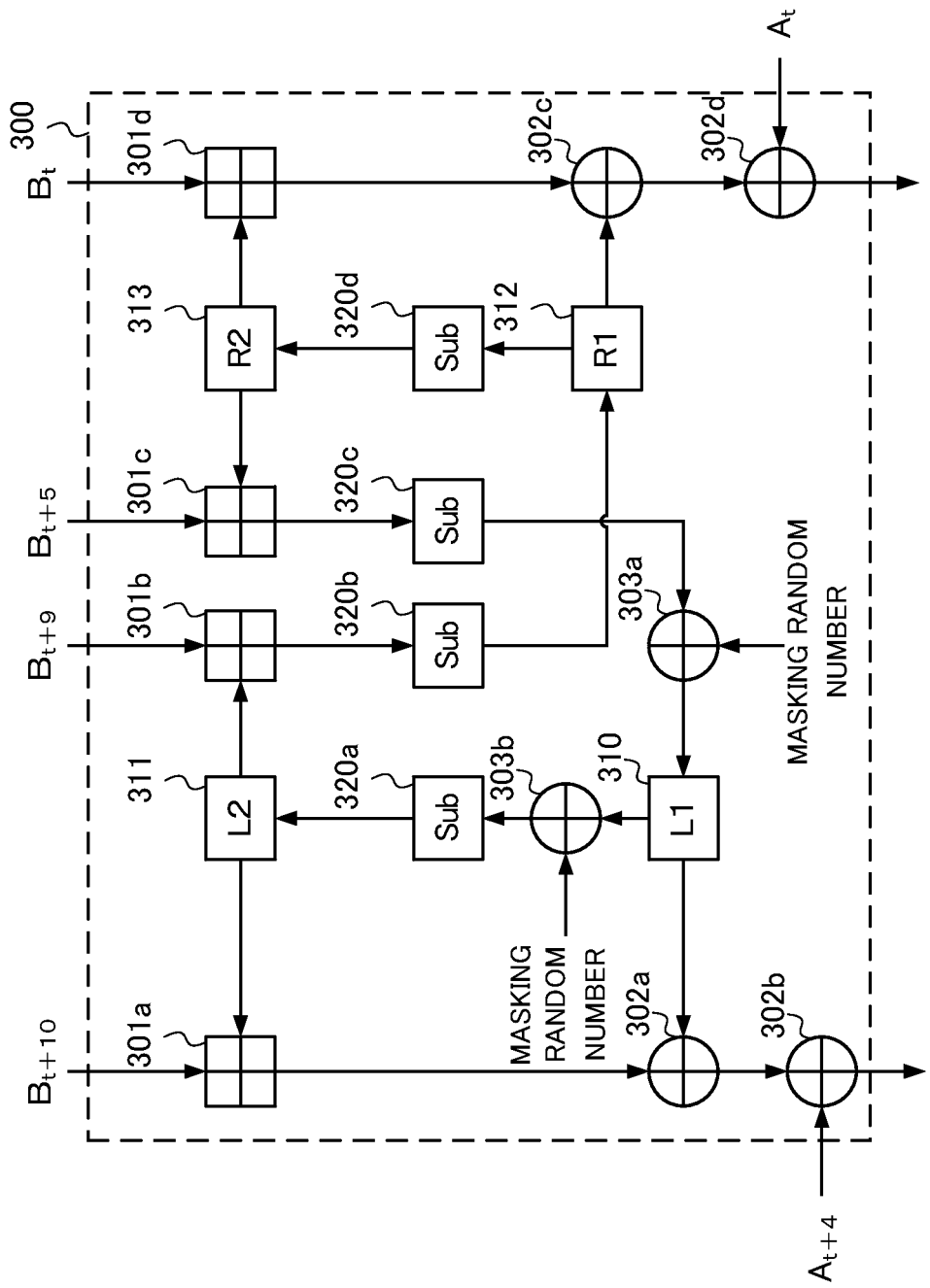
FIG. 3 is a drawing showing a configuration of the non-linear processor according to the first embodiment of the present invention.

The non-linear processor 300 subjects $A_t$ and $A_t+_4$ output from FSR-A 100a and $B_t$, $B_{t+4}$, $B_{t+9}$, and $B_{t+10}$ output from FSR-B 100b to non-linear processing and outputs a keystream. The non-linear processor 30 according to the present embodiment will be explained by using FIG. 2 showing the configuration of a conventional non-linear processor 30 and FIG. 3 showing the configuration of the non-linear processor 300 according to the present embodiment.
<Configuration of Non-Linear Processor>

First, the conventional non-linear processor 30 will be explained by using FIG. 2. As shown in FIG. 2, the conventional non-linear processor 30 is comprised of adders 301a, 301b, 301c, and 301d, internal registers (L1, L2, R1, R2) 310, 311, 312, and 313, Sub 320a, 320b, 320c, and 320d, and exclusive-OR operation units 302a, 302b, 302c, and 302d.

The adder 301a is connected to FSR-B 100b, the internal register L2, and the exclusive-OR operation unit 302a, adds the value output from the internal register L2 and the value output from $B_{t+10}$ of FSR-B 100b, and outputs that to the exclusive-OR operation unit 302a.

The adder 301b is connected to FSR-B 100b, the internal register L2, and Sub 320b, adds the value output from the internal register L2 and the value output from $B_{t+9}$ of FSR-B 100b, and outputs that to Sub 320b.

The adder 301c is connected to FSR-B 100b, the internal register R2, and Sub 320c, adds the value output from the internal register R2 and the value output from $B_{t+5}$ of FSR-B 100$b$, and outputs that to Sub 320$c$.

The adder 301$d$ is connected to FSR-B 100$b$, the internal register R2, and the exclusive-OR operation unit 302$b$, adds the value output from the internal register R2 and the value output from $B_t$ of FSR-B100$b$, and outputs that to the exclusive-OR operation unit 302$c$.

The internal register L1 stores the value obtained by subjecting the value which is output from the adder 301$c$ to non-linear substitution by Sub 320$c$.

The internal register L2 stores the value obtained by subjecting the value output from the internal register L1 to non-linear substitution by Sub 320$a$.

The internal register R1 stores the value obtained by subjecting the value output from the adder 301$b$ to non-linear substitution by Sub 320$b$.

The internal register R2 stores the value obtained by subjecting the value output from the internal register R1 to non-linear substitution by Sub 320$d$.

The exclusive-OR operation unit 302$a$ carries out an exclusive-OR operation of the value output from the adder 301$a$ and the value of the internal register L1 and outputs the operation result thereof to the exclusive-OR operation unit 302$b$.

The exclusive-OR operation unit 302$b$ carries out an exclusive-OR operation of the operation result of the exclusive-OR operation unit 302$a$ and the value output from $A_{t+4}$ of FSR-A 100$a$ and outputs the operation result thereof as a keystream.

The exclusive-OR operation unit 302$c$ carries out an exclusive-OR operation of the value output from the adder 301$d$ and the value of the internal register R1 and outputs the operation result thereof to the exclusive-OR operation unit 302$d$.

The exclusive-OR operation unit 302$d$ carries out an exclusive-OR operation of the operation result of the exclusive-OR operation unit 302$c$ and the value output from $A_t$ of FSR-A 100$a$ and outputs the operation result thereof as a keystream.

Next, the non-linear processor 300 according to the present embodiment will be explained by using FIG. 3. The constituent elements denoted with the same reference signs as those of the conventional non-linear processor 30 explained by using FIG. 2 have the same functions. Therefore, detailed explanation thereof will be omitted.

As shown in FIG. 3, the non-linear processor 300 according to the present embodiment is newly provided with exclusive-OR operation units 303$a$ and 303$b$ in addition to the constituent elements of the conventional non-linear processor 30.

The exclusive-OR operation unit 303$a$ carries out an exclusive-OR operation of the value, which is obtained by subjecting the value output from the adder 301$c$ to non-linear substitution by Sub 320$c$, and a masking random number and outputs the operation result thereof to the internal register L1. By virtue of this, as a result of masking the value, which is obtained by subjecting the value output from the adder 301$c$ to non-linear substitution by Sub 320$c$, in other words, the value stored in the internal register L1, with the masking random number, the correlation between the value stored in the internal register L1 and the secret key is eliminated, and side channel attacks can be prevented.

The masking random number is generated from part of the values stored in FSR-A 100$a$ and FSR-B 100$b$. The value(s) of the register(s) for which randomness of the value(s) is ensured because of update when the non-linear processor 300 outputs the key stream among the registers of FSR-A 100$a$ and FSR-B 100$b$ is used as the value(s) used in generation of the masking random number. The masking random number is generated by adding the value(s) extracted from the registers of FSR-A 100$a$ and FSR-B 100$b$. For example, the masking random number is generated by adding $A_{t+1}$ and $A_{t+2}$ of FSR-A 100$a$ and $B_{t+3}$ and $B_{t+9}$ of FSR-B 100$b$.

In this manner, since the masking random number is generated from the values stored in the registers of FSR-A 100$a$ and FSR-B 100$b$, a circuit for generating the masking random number is not additionally required.

In the present embodiment, the internal register L1 is different from the internal register L1 of the conventional non-linear processor 30 and stores the value masked by the exclusive-OR operation unit 303$a$.

The exclusive-OR operation unit 303$b$ carries out an exclusive-OR operation of the value output from the internal register L1 and the masking random number and outputs the operation result thereof to Sub 320$a$. As a result, the value which has been masked by exclusive-OR operation unit 303$a$ and stored in the internal register L1 is unmasked, and the unmasked value, in other words, the value which has undergone non-linear substitution by Sub 320$c$ is output to Sub 320$a$.

In the present embodiment, the value stored in the internal register L1 is masked. However, also for the other internal registers L2, R1, and R2, as well as the internal register L1, exclusive-OR operation units which carry out exclusive-OR operations of the values respectively input to the internal registers L2, R1, and R2 and masking random numbers may be provided at input ends thereof, and exclusive-OR operation units which carryout exclusive-OR operations of the values output respectively from the internal registers L2, R1, and R2 and the masking random numbers may be provided at output ends thereof. By virtue of that, the values respectively stored in the internal registers L2, R1, and R2 can be masked, and higher safety against side channel attacks can be ensured.

<Mask Process Flow in Non-Linear Processor>

Figure 4:
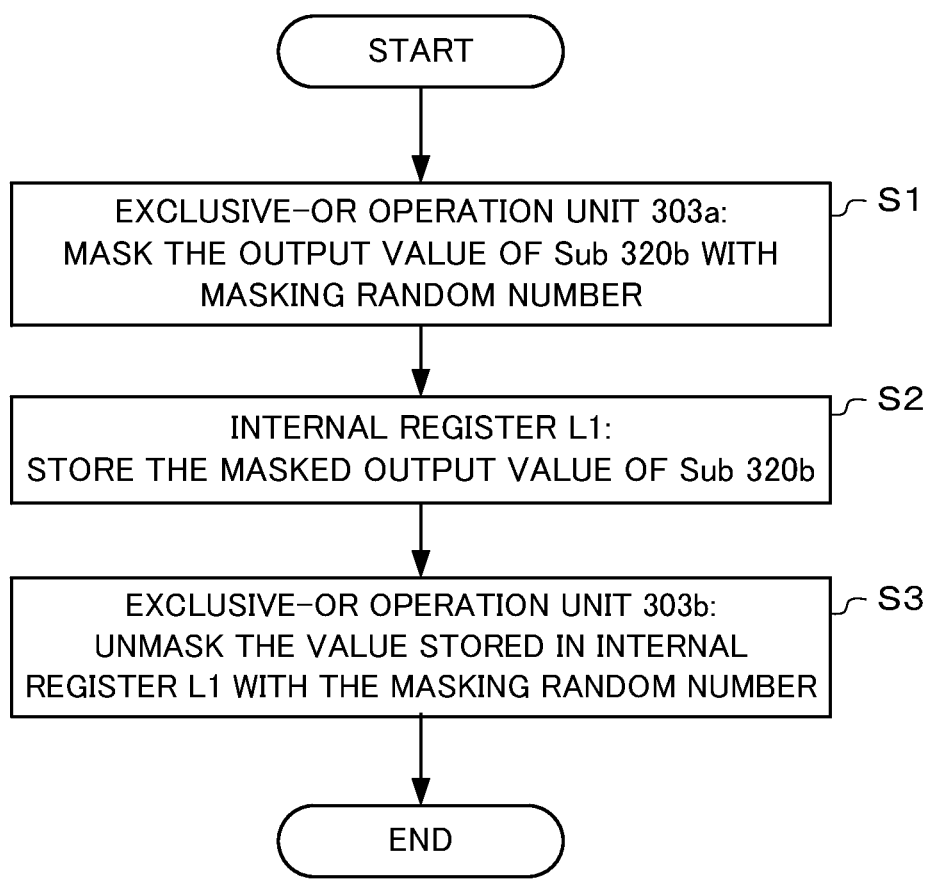
FIG. 4 is a drawing showing a mask processing flow of masking data in the non-linear processor in the non-linear processor according to the first embodiment of the present invention.

FIG. 4 is a drawing showing a mask process flow of masking data in the non-linear processor 300 in the non-linear processor 300 according to the present embodiment. In the present process flow, a process of masking the value of the internal register L1 is explained. However, also regarding the values of the other internal registers L2, R1, and R2, the values can be masked in the processes similar to that of the internal register L1.

First, in step S1, the exclusive-OR operation unit 303$a$ carries out an exclusive-OR operation of the output value of Sub 320$c$, in other words, the value obtained by subjecting the value output from the adder 301$c$ to non-linear substitution by Sub 320$c$ and the masking random number to mask the output value of Sub 320$c$.

Then, in step S2, the internal register L1 stores the output value of Sub 320$c$ masked in step S1.

Then, in step S3, the exclusive-OR operation unit 303$b$ carries out an exclusive-OR operation of the value stored in the internal register L1 in step S2 and the masking random number to unmask the value masked in step S1 and stored in the internal register L1. As a result, an unmasked value, in other words, the value obtained by non-linear substitution by Sub 320$c$ is obtained by Sub 320$a$.

First Application Example

Figure 5:
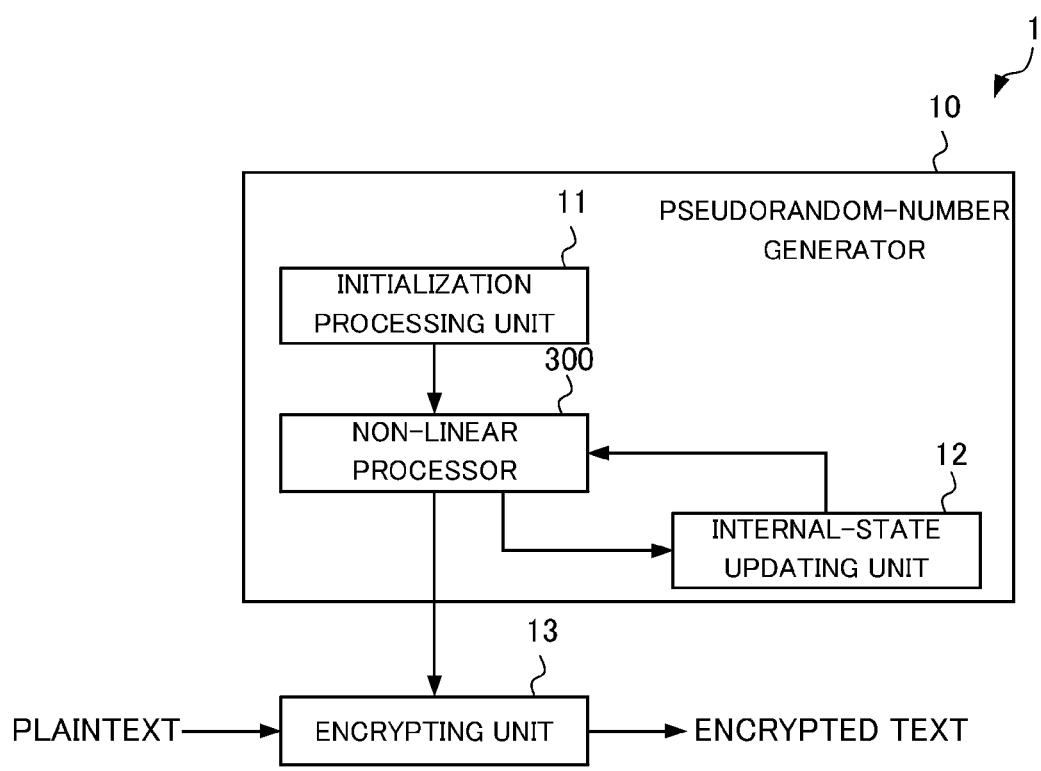
FIG. 5 is a drawing showing a functional configuration of a stream-cipher encrypting device according to a first application example.

As shown in FIG. 5, a stream-cipher encrypting device 1 according to a present application example is comprised of an initialization processing unit 11, the non-linear processor 300, an internal-state updating unit 12, and an encrypting unit 13. Since the non-linear processor 300 has been explained above, detailed explanation thereof will be omitted.

The initialization processing unit 11 initializes the internal state of a stream cipher based on a secret key and an initial vector, and feedback shift registers (FSR-A 100a and FSR-B 100b) maintain an initialized internal state. Specifically, the initialization processing unit 11 determines the internal state (pseudorandom number(s)) of the stream cipher according to an incorporated key schedule algorithm, inputs the determined internal state to the feedback registers, and then carries out idling a plurality of times, thereby maintaining the initialized internal state. The internal-state updating unit 12 updates the internal state by, for example, a one-way function when the non-linear processor 300 outputs a keystream, and the feedback shift registers maintain the updated internal state. The encrypting unit 13 carries out an exclusive-OR operation of the keystream generated by the non-linear processor 300 and a plaintext input from outside, thereby outputting an encrypted text.

Therefore, since the stream encrypting device 1 of the present application example is built by using the non-linear processor 300, an encrypting device capable of safely executing encryption can be formed without additionally providing a circuit for generating random numbers for masking the values during encrypting processes. Moreover, the encrypting device which has small influence on processing speeds, power consumption, etc. and can be mounted on a device such as an IC card can be formed.

Second Application Example

Figure 6:
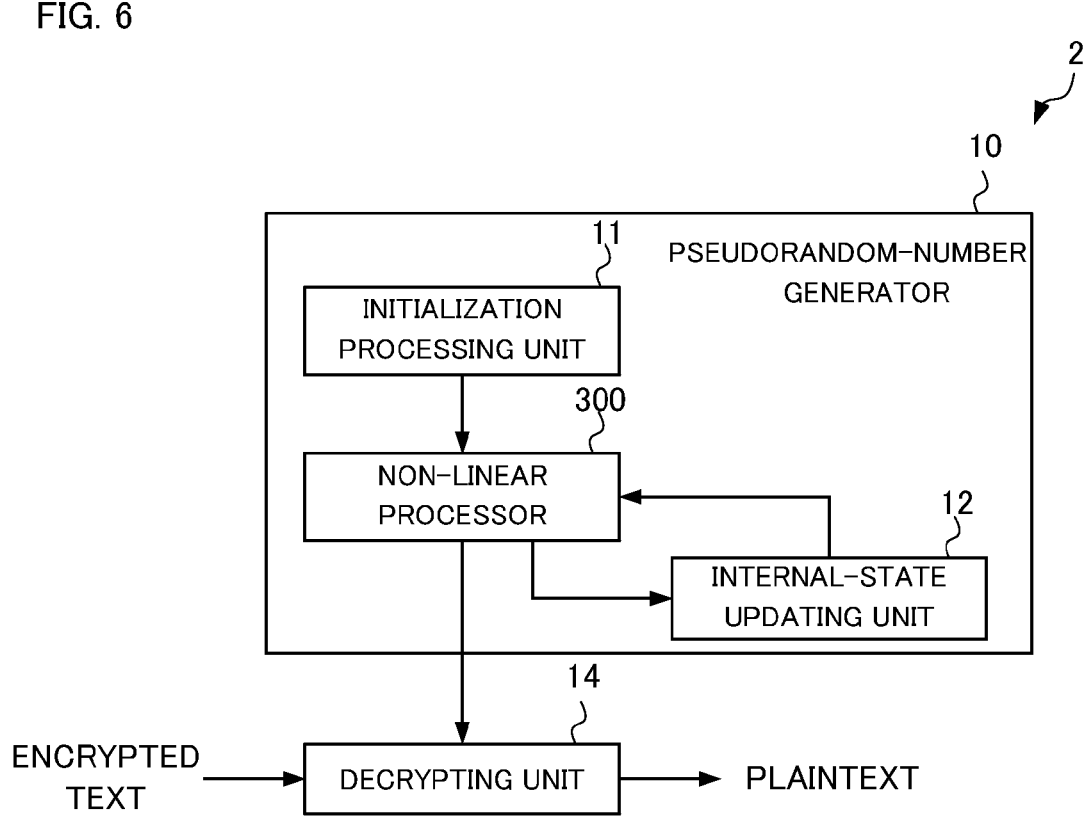
FIG. 6 is a drawing showing a functional configuration of a stream-cipher decrypting device according to a second application example.

As shown in FIG. 6, a stream-cipher decrypting device 2 according to a present application example is comprised of the initialization processing unit 11, the non-linear processor 300, the internal-state updating unit 12, and a decrypting unit 14. Since the non-linear processor 300 has been explained above, detailed explanation thereof will be omitted.

The initialization processing unit 11 initializes the internal state of a stream cipher based on a secret key and an initial vector, and feedback shift registers (FSR-A 100a and FSR-B 100b) maintain an initialized internal state. Specifically, the initialization processing unit 11 determines the internal state (pseudorandom number(s)) of the stream cipher according to an incorporated key schedule algorithm, inputs the determined internal state to the feedback registers, and then carries out idling a plurality of times, thereby maintaining the initialized internal state. The internal-state updating unit 12 updates the internal state by, for example, a one-way function when the non-linear processor 300 outputs a keystream, and the feedback shift registers maintain the updated internal state. The decrypting unit 14 carries out an exclusive-OR operation of the keystream generated by the non-linear processor 300 and an encrypted text input from outside, thereby outputting a plaintext.

Therefore, since the stream decrypting device 2 of the present application example is built by using the non-linear processor 300, a decrypting device capable of safely executing encryption can be formed without additionally providing a circuit for generating random numbers for masking the values during decrypting processes. Moreover, the decrypting device which has small influence on processing speeds, power consumption, etc. and can be mounted on a device such as an IC card can be formed.

Second Embodiment

A second embodiment of the present invention will be explained by using FIG. 7 to FIG. 12.
<Brief Configuration of Stream-Cipher Encrypting Device>
The stream-cipher encrypting device according to the present embodiment will be explained by using FIG. 7 and FIG. 8.

Figure 7:
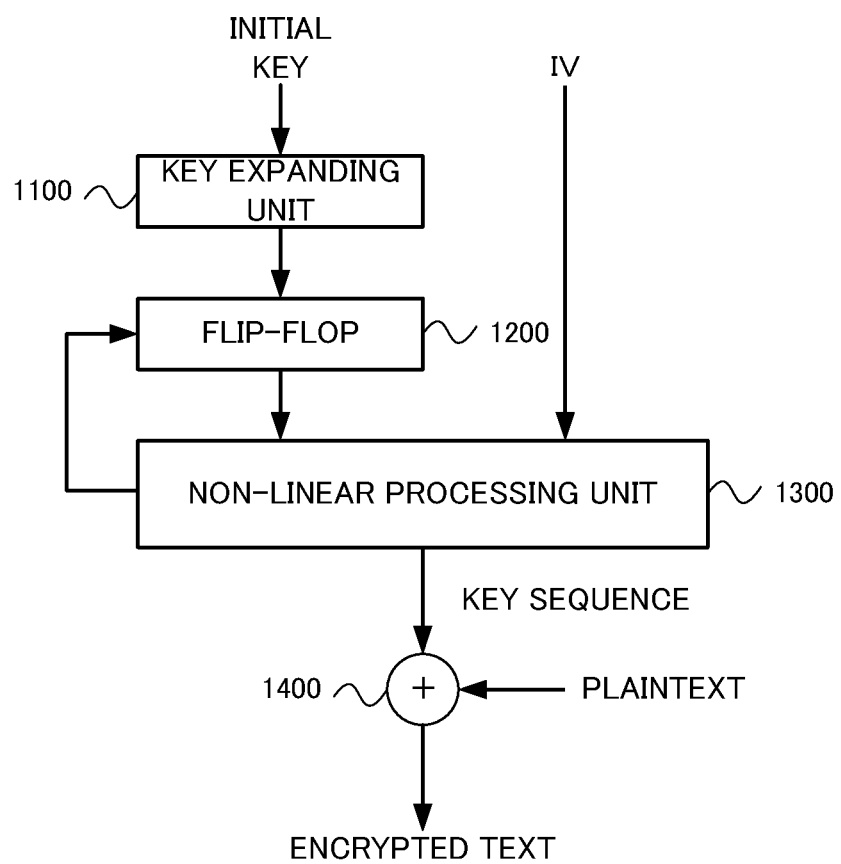
FIG. 7 is a drawing showing a schematic configuration of a stream-cipher encrypting device according to a second embodiment of the present invention.

As shown in FIG. 7, the stream-cipher encrypting device according to the present embodiment is comprised of a key expanding unit 1100, a flip-flop 1200, a non-linear processing unit 1300, and an exclusive-OR operation unit 1400.

An initial key is input to the key expanding unit 1100 to generate an expanded key. The flip-flop 1200 is a switching element. Specifically, in an initial processing state, the flip-flop 1200 works so as to input the expanded key, which has been generated by the key expanding unit 1100, to the non-linear processing unit 1300 and, after initial processing is terminated, works so as to input a feedback value, which is from the non-linear processing unit 1300, to an unshown register in the non-linear processing unit 1300.

Figure 8:
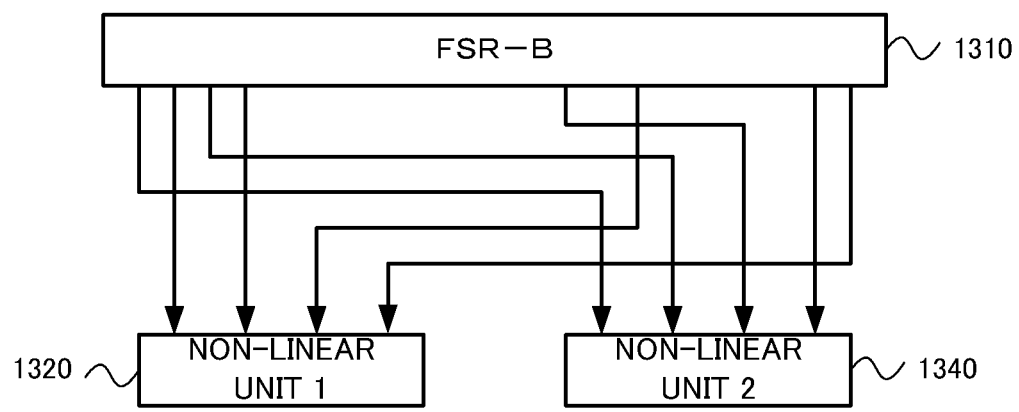
FIG. 8 is a drawing showing a schematic configuration of a non-linear processing unit of the stream-cipher encrypting device according to the second embodiment of the present invention.
Figure 9:
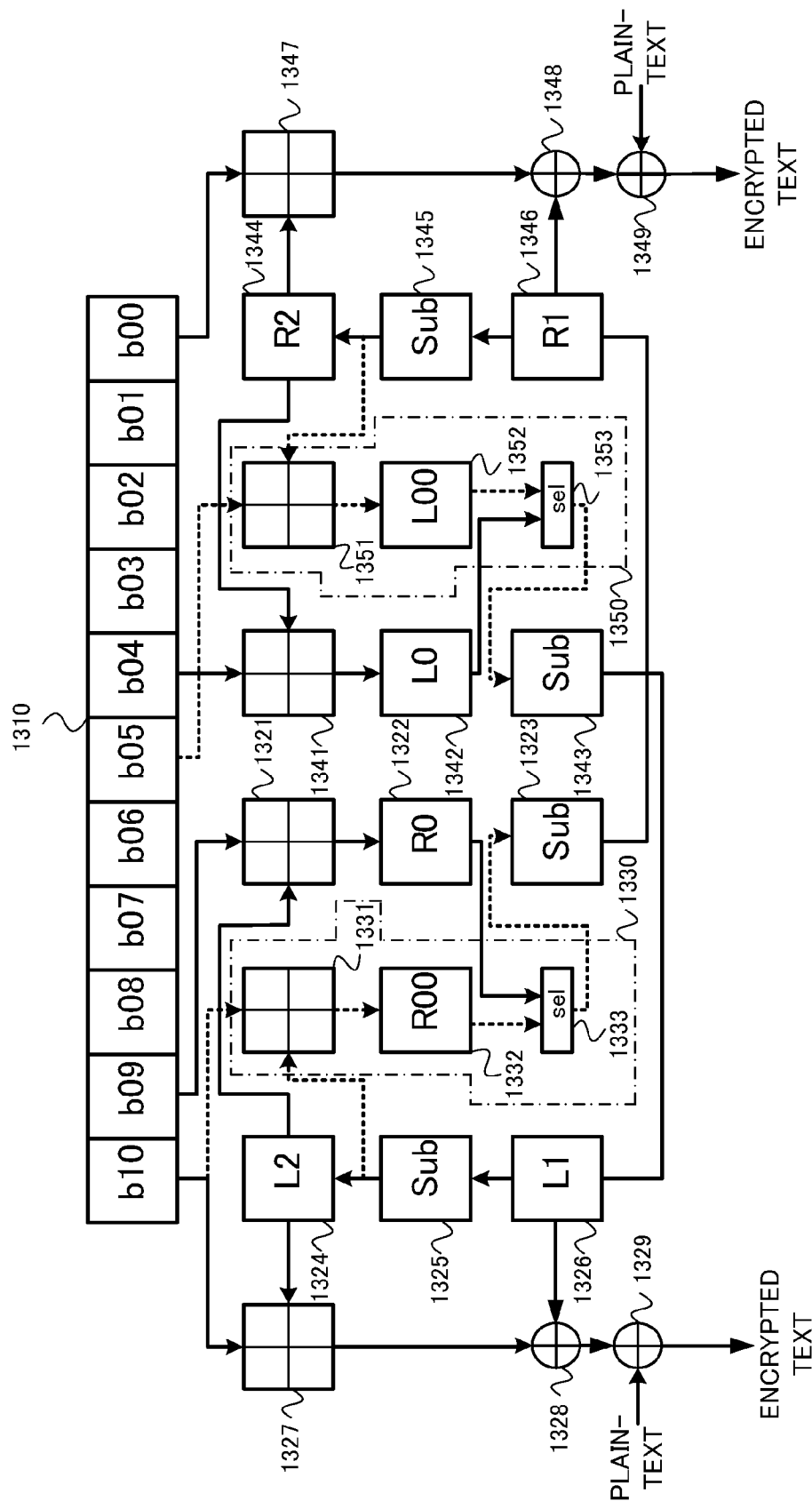
FIG. 9 is a drawing showing a configuration of the non-linear processing unit of the stream-cipher encrypting device according to the second embodiment of the present invention.
Figure 10:
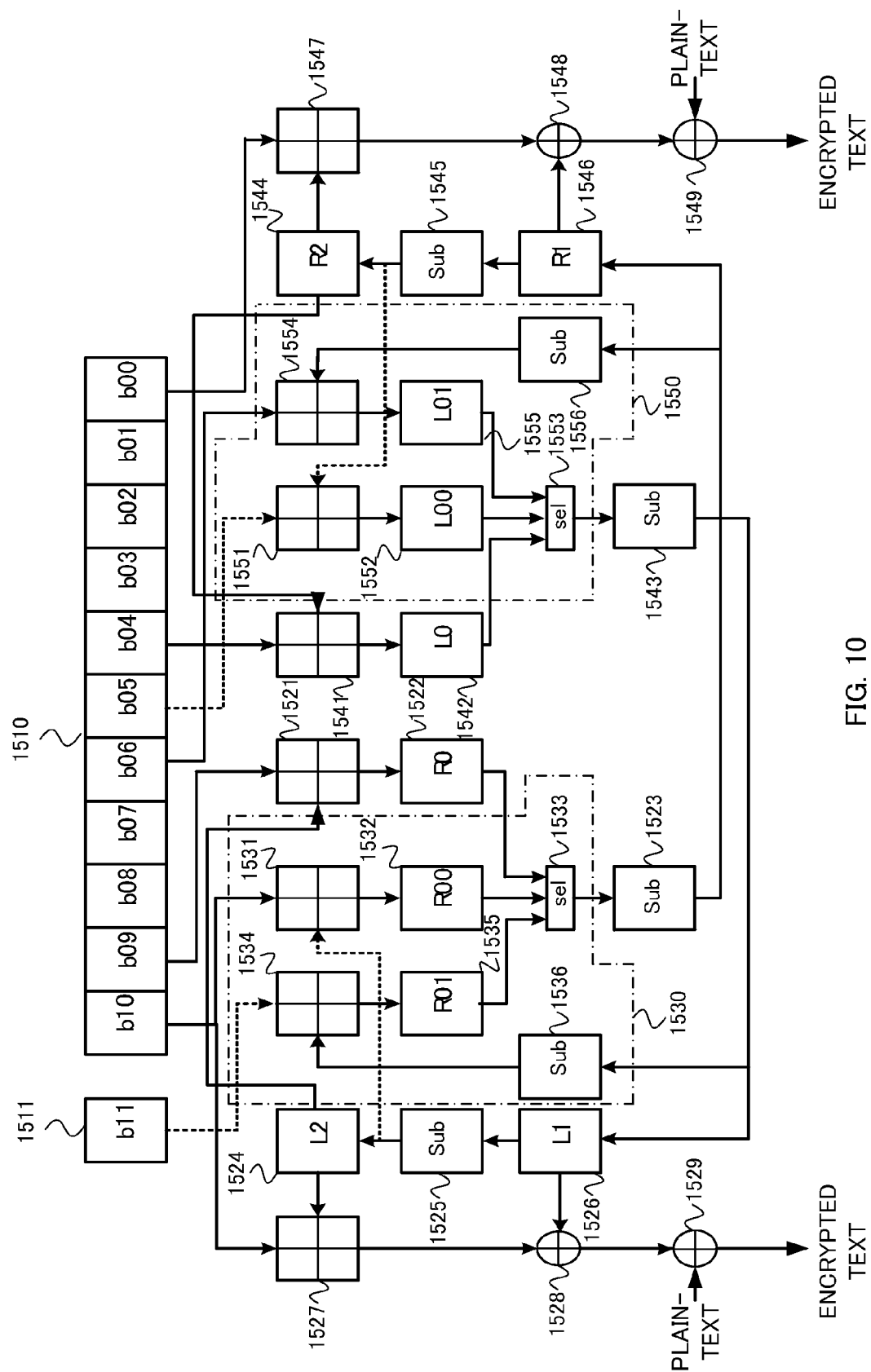
FIG. 10 is a drawing showing a configuration of the non-linear processing unit of the stream-cipher encrypting device according to the second embodiment of the present invention.

As shown in FIG. 8, the non-linear processing unit 1300 is comprised of a plurality of non-linear elements, parallelly executes non-linear processing, and outputs a key sequence. The exclusive-OR operation unit 1400 executes an exclusive-OR operation of the key sequence output from the non-linear processing unit 1300 and an input plaintext to generate an encrypted text. In the present embodiment, the configuration provided with the key expanding unit 1100 has been explained. However, an expanded key may be prepared in advance without providing the key expanding unit 1100.
<Configuration of Non-Linear Processing Unit>
The configuration of the non-linear processing unit in the stream-cipher encrypting device according to the present embodiment will be explained by using FIG. 9 and FIG. 10. FIG. 9 is a configuration diagram of a case in which an adding process is duplexed, and FIG. 10 is a configuration diagram of a case in which an adding process is tripled.

As shown in FIG. 9, the non-linear processing unit in the stream-cipher encrypting device according to the present embodiment is comprised of a register 1310, adders 1321, 1327, 1331, 1341, 1347, and 1351, internal memories 1322, 1324, 1326, 1332, 1342, 1344, 1346, and 1352, non-linear function units 1323, 1325, 1343, and 1345, and selectors 1333 and 1353.

The register 1310 is preferred to be a feedback shift register. The adder 1321 is connected to the register 1310 and the internal memory 1324, and the addition value thereof is stored in the internal memory 1322. The adder 1331 is connected to the outputs of the register 1310 and the non-linear function unit 1325, and the addition value thereof is stored in the internal memory 1332. The selector 1333 is connected to the internal memory 1322 and the internal memory 1332 and selects either value. Then, the selected value is output to the non-linear function unit 1323.

The non-linear function unit 1323 stores the operation result thereof in the internal memory 1346, and the stored value is output to an exclusive-OR operation unit 1348 and the non-linear function unit 1345. The non-linear function unit 1345 outputs the operation result to the internal memory 1344 and the adder 1351. The value stored in the internal memory 1344 is output to the adder 1347. The adder 1347 adds a value from the register 1310 and the value stored in the internal memory 1344 and outputs the operation result thereof to the exclusive-OR operation unit 1348. The exclusive-OR operation unit 1348 outputs a key sequence, which is the operation result thereof, to an exclusive-OR operation unit 1349, and the exclusive-OR operation unit 1349 carries out an exclusive-OR operation of the key sequence and an input plaintext and outputs an encrypted text.

Meanwhile, the operation result of the non-linear function unit 1345 is supplied to the adder 1351. The adder 1351 adds a value which is from the register 1310 and the operation result from the non-linear function unit 1345 and stores that in the internal memory 1352. The value stored in the internal memory 1344 is supplied to the adder 1341, and the adder 1341 adds that and a value from the register 1310 and stores the value in the internal memory 1342. The selector 1353 reads values from the internal memories 1352 and 1342, selects either value, and outputs that to the non-linear function unit 1343.

The non-linear function unit 1343 stores the operation result in the internal memory 1326. The value stored in the internal memory 1326 is supplied to an exclusive-OR operation unit 1328 and the non-linear function unit 1325. The non-linear function unit 1325 stores the operation result thereof in the internal memory 1324 and outputs that to the adder 1331.

The value stored in the internal memory 1324 is supplied to the adder 1321 and the adder 1327. The adder 1327 adds the value stored in the internal memory 1324 and a value from the register 1310 and outputs the value to the exclusive-OR operation unit 1328. The exclusive-OR operation unit 1328 carries out an exclusive-OR operation of the value from the adder 1327 and the value of the internal memory 1326 to generate a key sequence and outputs that to an exclusive-OR operation unit 1329. The key sequence and a plaintext are input to the exclusive-OR operation unit 1329, and the exclusive-OR operation unit 1329 carries out an exclusive-OR operation thereof, thereby outputting an encrypted text.

In the drawing, the blocks surrounded by dashed-dotted lines are the blocks newly provided for multiplexing; wherein, since the values of the register first clock signal or second clock signal thereafter are required along with multiplexing, the values of the register are obtained from respective corresponding parts.

As shown in FIG. 10, the non-linear processing unit in the stream-cipher encrypting device according to the present embodiment is comprised of registers 1510 and 1511, adders 1521, 1527, 1531, 1534, 1541, 1547, 1551, and 1554, internal memories 1522, 1524, 1526, 1532, 1535, 1542, 1544, 1546, 1552, and 1555, non-linear function units 1523, 1525, 1536, 1543, 1545, and 1556, and selectors 1533 and 1553.

The register 1510 is preferred to be a feedback shift register. The adder 1521 is connected to the register 1510 and the internal memory 1524 and stores the addition value thereof in the internal memory 1522. The adder 1531 is connected to outputs of the register 1510 and the non-linear function unit 1525 and stores the addition value thereof in the internal memory 1532. The adder 1534 is connected to the register 1511 and the non-linear function unit 1536 and stores the addition value thereof in the internal memory 1535. The selector 1533 is connected to the internal memories 1522, 1532, and 1535 and selects any of the values thereof. Then, the selected value is output to the non-linear function unit 1523.

The non-linear function unit 1523 stores the operation result in the internal memory 1546 and outputs that to the non-linear function unit 1556. The stored value is output to an exclusive-OR operation unit 1548 and the non-linear function unit 1545. The non-linear function unit 1545 outputs the operation result to the internal memory 1544 and the adder 1551. The value stored in the internal memory 1544 is output to the adder 1547. The adder 1547 adds the value from the register 1510 and the value stored in the internal memory 1544 and outputs the operation result thereof to the exclusive-OR operation unit 1548. The exclusive-OR operation unit 1548 outputs a key sequence, which is the operation result thereof, to the exclusive-OR operation unit 1549, and the exclusive-OR operation unit 1549 carries out an exclusive-OR operation of the key sequence and an input plaintext and outputs an encrypted text.

Meanwhile, the operation result of the non-linear function unit 1545 is supplied to the adder 1551. The adder 1551 adds the value from the register 1510 and the operation result from the non-linear function unit 1545 and stores that in the internal memory 1552. The value stored in the internal memory 1544 is supplied to the adder 1541, and the adder 1541 adds a value from the register 1510 thereto and stores the value in the internal memory 1542. Furthermore, the adder 1554 adds the operation result of the non-linear function unit 1556 and a value from the register 1510 and stores that in the internal memory 1555. The selector 1553 reads values from the internal memories 1552, 1542, and 1555, selects any of the values, and outputs that to the non-linear function unit 1543.

The non-linear function unit 1543 stores the operation result in the internal memory 1526 and outputs that to the non-linear function unit 1536. The value stored in the internal memory 1526 is supplied to an exclusive-OR operation unit 1528 and the non-linear function unit 1525. The non-linear function unit 1525 stores the operation result in the internal memory 1524 and outputs that to the adder 1531.

The value stored in the internal memory 1524 is supplied to the adder 1521 and the adder 1527. The adder 1527 adds the value stored in the internal memory 1524 and a value from the register 1510 and outputs the value to the exclusive-OR operation unit 1528. The exclusive-OR operation unit 1528 carries out an exclusive-OR operation of the value from the adder 1527 and the value from the internal memory 1526 to generate a key sequence and outputs that to an exclusive-OR operation unit 1529. The key sequence and a plaintext are input to the exclusive-OR operation unit 1529, and the exclusive-OR operation unit 1529 carries out an exclusive-OR operation thereof, thereby outputting an encrypted text.

In the drawing, the blocks surrounded by dashed-dotted lines are the blocks newly provided for multiplexing; wherein, since the values of the register first clock signal or second clock signal thereafter are required along with multiplexing, the values of the register are obtained from respective corresponding parts. In the tripling shown in FIG. 10, since the feedback value of the register 1510 first clock signal thereafter is required, the register 1511 for storing that is prepared. Since the non-linear unit, in which adding processing is multiplexed, is further multiplexed, further speed-up can be implemented.

<Processing of Stream-Cipher Encrypting Device>

Figure 11:
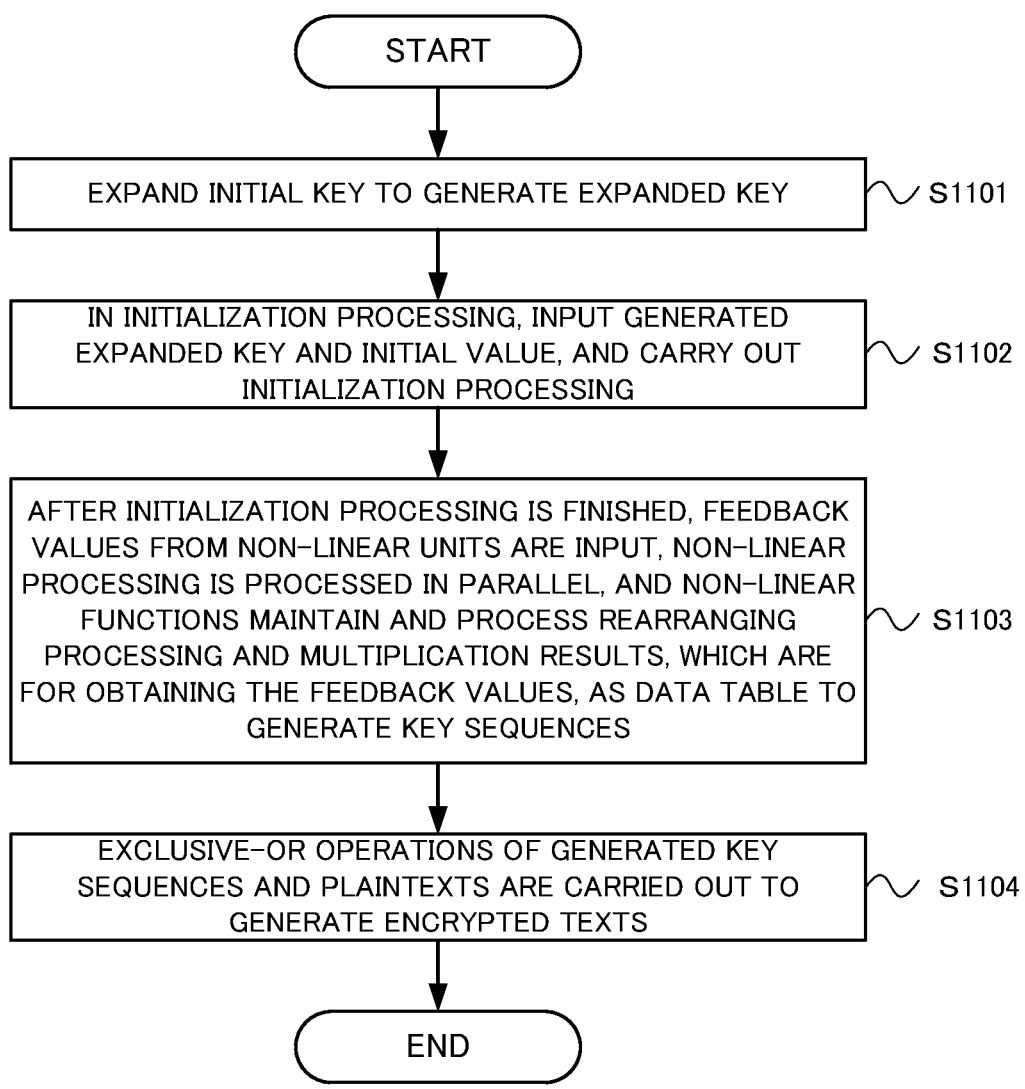
FIG. 11 is a drawing showing processing of the stream-cipher encrypting device according to the second embodiment of the present invention.

Processing of the stream-cipher encrypting device according to the present embodiment will be explained by using FIG. 11.

First, the key expanding unit 1100 expands an initial key to generate an expanded key (step S1101), and, in initialization processing, the generated expanded key and the initial value are input to carry out the initialization processing (step S1102).

Then, after the initialization processing is finished, feedback values from the non-linear processing unit 1300 are input, non-linear processing is processed in parallel, and non-linear functions maintain and process rearranging processing and the multiplication results, which are for obtaining the feedback values, as a data table to generate key sequences (step S1103). Exclusive-OR operations of the generated key sequences and plaintexts are carried out to generate encrypted texts (step S1104).

As explained above, according to the present embodiment, the flip-flop is added to the path in which a data delay amount is the maximum, and the path is divided; as a result, an operation clock is improved, and speed-up can be implemented. The speed-up can be implemented by multiplexing part of the processes of the non-linear unit. Moreover, the speed-up can be also implemented by further multiplexing the entire multiplexed non-linear unit. The initialization processing and key-stream generating processing, which have been conventionally executed in a single circuit, are executed in respective different circuits. As a result, key expanding processing is not required to be carried out upon key-sequence generation, and speed-up can be realized.

Third Embodiment

A third embodiment of the present invention will be explained by using FIG. 12 to FIG. 15.

<Brief Configuration of Stream-Cipher Decrypting Device>

Figure 12:
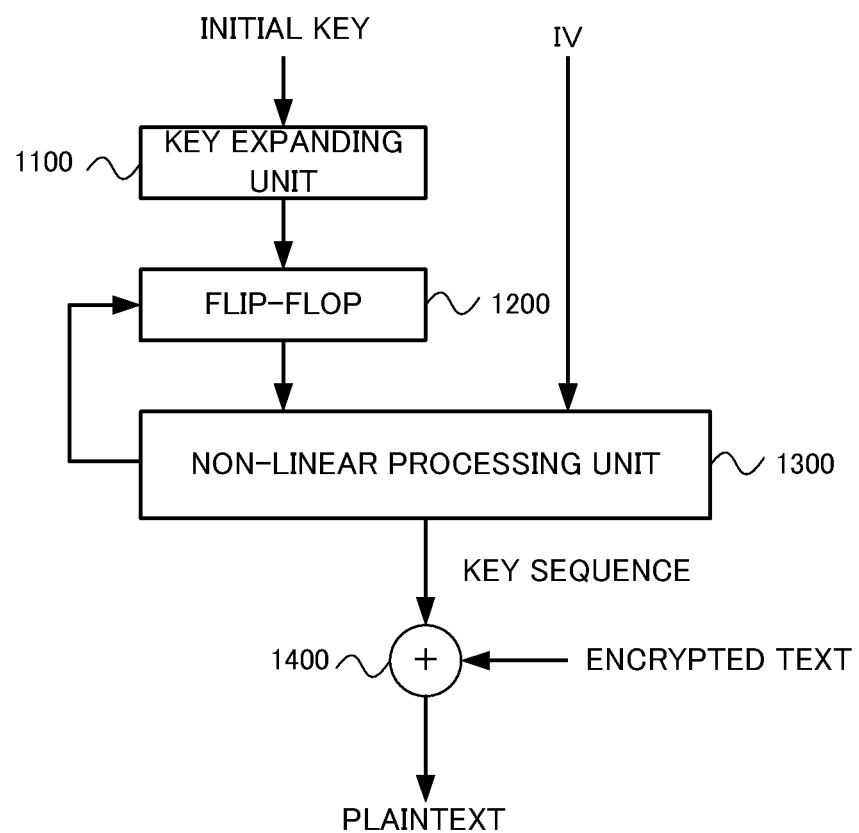
FIG. 12 is a drawing showing a schematic configuration of a stream-cipher decrypting device according to a third embodiment of the present invention.

As shown in FIG. 12, a stream-cipher decrypting device according to the present embodiment is comprised of a key expanding unit 1100, a flip-flop 1200, a non-linear processing unit 1300, and an exclusive-OR operation unit 1400. Since the constituent elements denoted with the same reference signs as those of the second embodiment have similar functions, detailed explanations thereof are omitted. Thus, the configuration of the stream-cipher decrypting device according to the present embodiment is similar to the configuration of the stream-cipher encrypting device according to the second embodiment and is different only in a point that an encrypted text is input to the exclusive-OR operation unit 1400 to obtain a plaintext.

<Configuration of Non-Linear Processing Unit>

Figure 13:
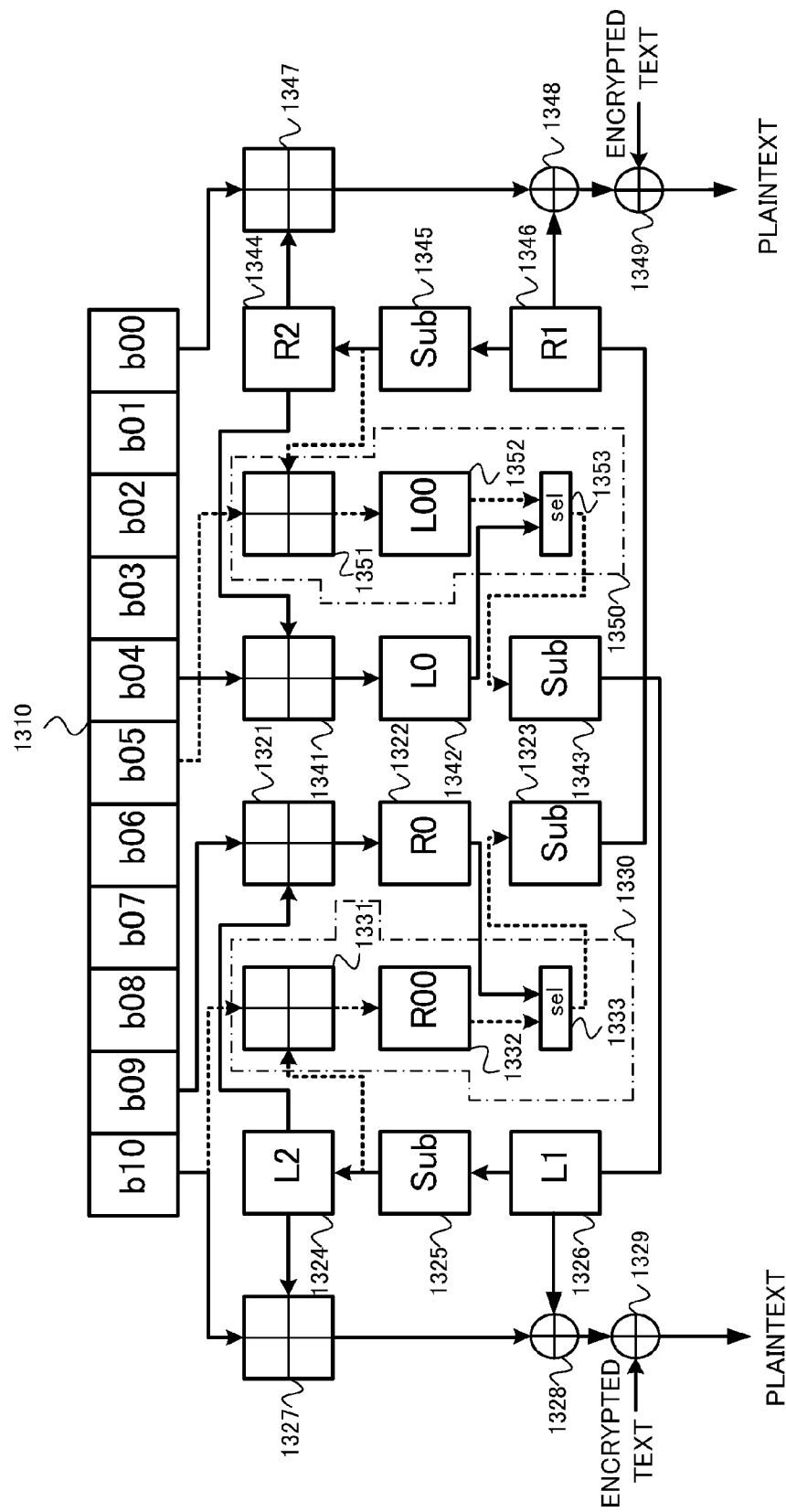
FIG. 13 is a drawing showing a configuration of a non-linear processing unit of the stream-cipher decrypting device according to a third embodiment of the present invention.

The configuration of the non-linear processing unit in the stream-cipher decrypting device according to the present embodiment will be explained by using FIG. 13 and FIG. 14. FIG. 13 is a configuration diagram of a case in which adding processing is duplexed, and FIG. 14 is a configuration diagram of a case in which adding processing is tripled.

As shown in FIG. 13, the non-linear processing unit in the stream-cipher decrypting device according to the present embodiment is comprised of a register 1310, adders 1321, 1327, 1331, 1341, 1347, and 1351, internal memories 1322, 1324, 1326, 1332, 1342, 1344, 1346, and 1352, non-linear function units 1323, 1325, 1343, and 1345, and selectors 1333 and 1353.

Figure 14:
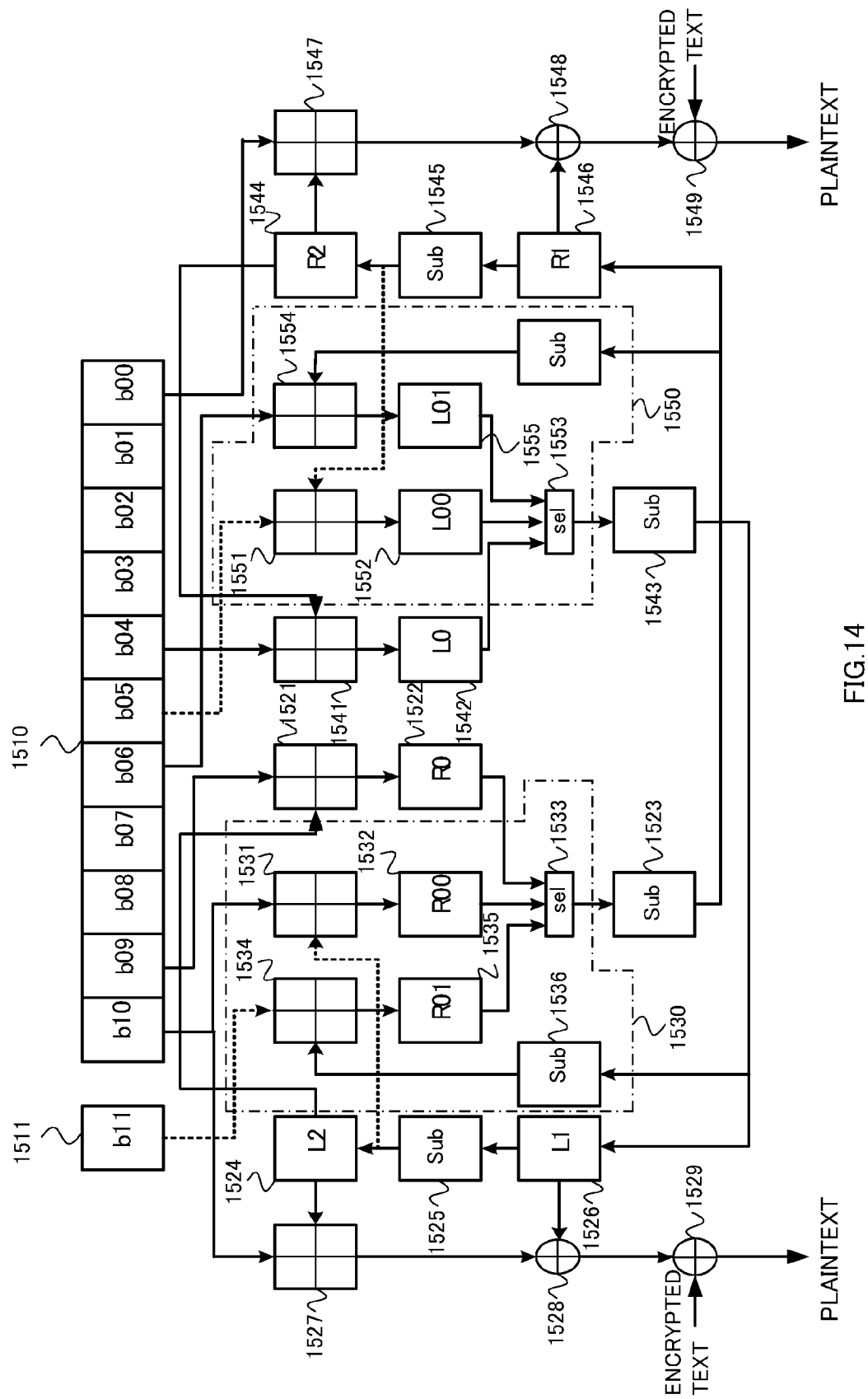
FIG. 14 is a drawing showing a configuration of the non-linear processing unit of a stream-cipher decrypting device according to the second embodiment of the present invention.

As shown in FIG. 14, the non-linear processing unit in the stream-cipher decrypting device according to the present embodiment is comprised of registers 1510 and 1511, adders 1521, 1527, 1531, 1534, 1541, 1547, 1551, and 1554, internal memories 1522, 1524, 1526, 1532, 1535, 1542, 1544, 1546, 1552, and 1555, non-linear function units 1523, 1525, 1536, 1543, 1545, and 1556, and selectors 1533 and 1553.

Since the constituent elements denoted with the same reference signs as those of the second embodiment have similar functions, detailed explanations thereof are omitted. Thus, the configuration of the stream-cipher decrypting device according to the present embodiment is similar to the configuration of the stream-cipher encrypting device according to the second embodiment and is different only in a point that encrypted texts are input to the exclusive-OR operation units 1329, 1349, 1529, and 1549 to obtain plaintexts.

<Processing of Stream-Cipher Decrypting Device>

Figure 15:
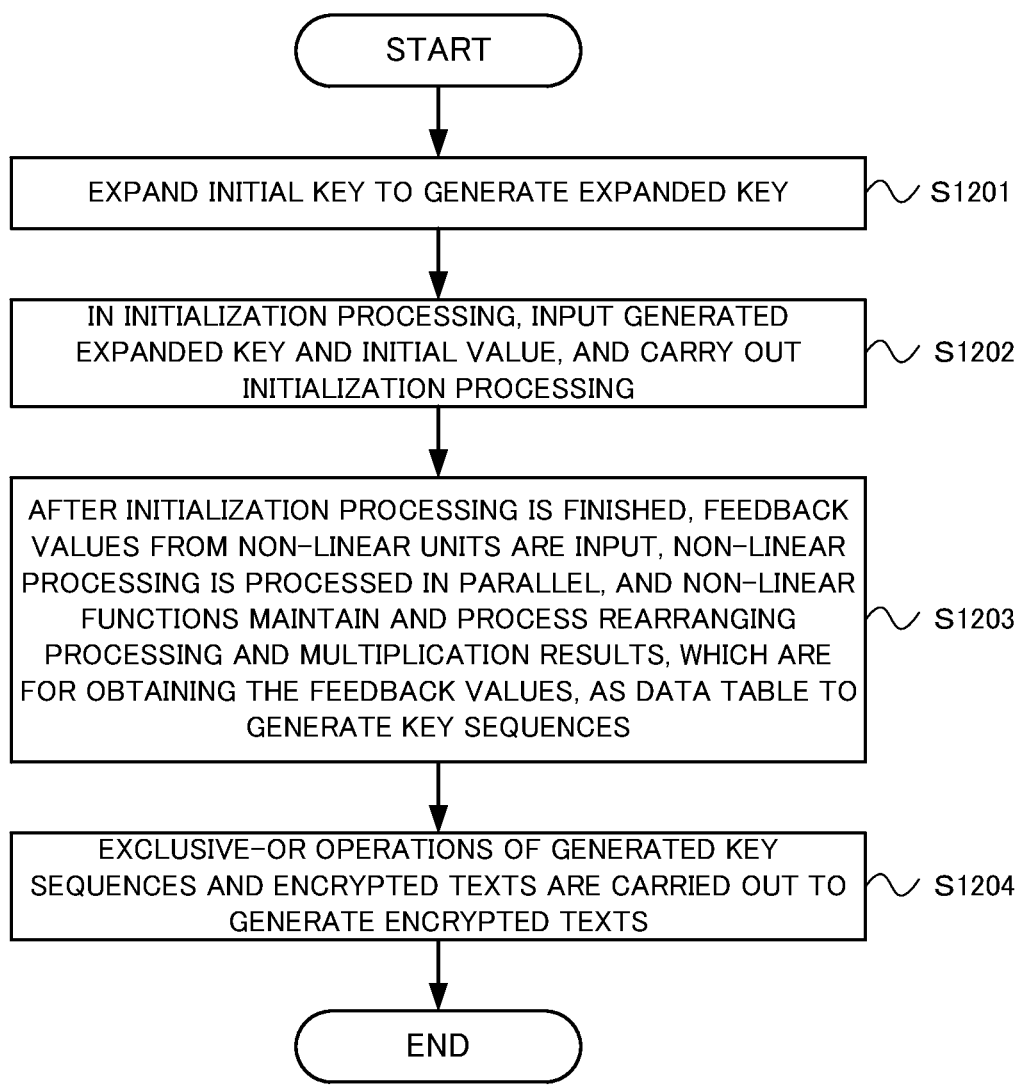
FIG. 15 is a drawing showing processing of the stream-cipher decrypting device according to the second embodiment of the present invention.

Processing of the stream-cipher decrypting device according to the present embodiment will be explained by using FIG. 15.

First, the key expanding unit 1100 expands an initial key to generate an expanded key (step S1201), and, in initialization processing, the generated expanded key and the initial value are input to carry out the initialization processing (step S1202).

Then, after the initialization processing is finished, feedback values from the non-linear processing unit 1300 are input, non-linear processing is processed in parallel, and non-linear functions maintain and process rearranging processing and the multiplication results, which are for obtaining the feedback values, as a data table to generate key sequences (step S1203). Exclusive-OR operations of the generated key sequences and encrypted texts are carried out to generate encrypted texts (step S1204).

As explained above, according to the present embodiment, the flip-flop is added to the path in which a data delay amount is the maximum, and the path is divided; as a result, an operation clock is improved, and speed-up can be implemented. The speed-up can be implemented by multiplexing part of the processes of the non-linear unit. Moreover, the speed-up can be also implemented by further multiplexing the entire multiplexed non-linear unit. The initialization processing and key-stream generating processing, which have been conventionally executed in a single circuit, are executed in respective different circuits. As a result, key expanding processing is not required to be carried out upon key-sequence generation, and speed-up can be realized.

The stream-cipher encrypting device and the stream-cipher decrypting device of the present invention can be realized by recording the processing of the stream-cipher encrypting device and the stream-cipher decrypting device in a computer readable recording medium and causing the stream-cipher encrypting device and the stream-cipher decrypting device to read and execute the program recorded in the recording medium. This computer system referred to herein includes hardware such as OS and peripheral devices.

Also, "computer system" includes a website providing environment (or displaying environment) in a case in which a WWW (World Wide Web) system is used. Also, the above described program may be transmitted from a computer system storing this program in a storage device or the like to another computer system via a transmission medium or by transmission waves in a transmission medium. The "transmission medium", which transmits the program, refers to a medium having a function to transmit information like a network (communication network) such as the Internet and a communication link (communication line) such as a telephone line.

Moreover, the above described program may be a program for realizing part of the above described functions. Furthermore, the above described program may be a program that can realize the above described functions in combination with a program already recorded in the computer system, i.e., may be a so-called differential file (differential program).

The embodiments of the invention have been described above in detail by referencing the drawings. However, specific configurations are not limited to these embodiments, but include designs, etc. within a range not departing from the gist of the invention.

REFERENCE MARKS IN THE DRAWINGS

1 ENCRYPTING DEVICE
2 DECRYPTING DEVICE
10 PSEUDORANDOM-NUMBER GENERATOR
11 INITIALIZATION PROCESSING UNIT
12 INTERNAL-STATE UPDATING UNIT
13 ENCRYPTING UNIT
14 DECRYPTING UNIT
100a, 100b FEEDBACK SHIFT REGISTER
200 CLOCK CONTROL DEVICE
300 NON-LINEAR PROCESSOR
301a, 301b, 301c, 301d ADDER
302a, 302b, 302c, 302d, 303a, 303b EXCLUSIVE-OR OPERATION UNIT
310, 311, 312, 313 INTERNAL REGISTER (L1, L2, R1, R2)
320a, 320b, 320c, 320d NON-LINEAR SUBSTITUTION UNIT (Sub)
1100; KEY EXPANDING UNIT
1200; FLIP-FLOP
1300; NON-LINEAR PROCESSING UNIT
1310; REGISTER
1321; ADDER
1327; ADDER
1331; ADDER
1341; ADDER
1347; ADDER
1351; ADDER
1322; INTERNAL MEMORY
1324; INTERNAL MEMORY
1326; INTERNAL MEMORY
1332; INTERNAL MEMORY
1342; INTERNAL MEMORY
1344; INTERNAL MEMORY
1346; INTERNAL MEMORY
1352; INTERNAL MEMORY
1323; NON-LINEAR FUNCTION UNIT
1325; NON-LINEAR FUNCTION UNIT
1343; NON-LINEAR FUNCTION UNIT
1345; NON-LINEAR FUNCTION UNIT
1333; SELECTOR
1353; SELECTOR
1400; EXCLUSIVE-OR OPERATION UNIT
1521; ADDER
1527; ADDER
1531; ADDER
1534; ADDER
1541; ADDER
1547; ADDER
1551; ADDER
1554; ADDER
1522; INTERNAL MEMORY
1524; INTERNAL MEMORY
1526; INTERNAL MEMORY
1532; INTERNAL MEMORY
1535; INTERNAL MEMORY
1542; INTERNAL MEMORY
1544; INTERNAL MEMORY
1546; INTERNAL MEMORY
1552; INTERNAL MEMORY
1555; INTERNAL MEMORY
1523; NON-LINEAR FUNCTION UNIT
1525; NON-LINEAR FUNCTION UNIT
1536; NON-LINEAR FUNCTION UNIT
1543; NON-LINEAR FUNCTION UNIT
1545; NON-LINEAR FUNCTION UNIT
1556; NON-LINEAR FUNCTION UNIT
1533; SELECTOR
1553; SELECTOR

The invention claimed is:

1. A non-linear processor that subjects an input value from a feedback shift register to non-linear processing to output a key stream, the feedback shift register maintaining an internal state of a stream cipher initialized based on a secret key and an initial vector or an internal state of the stream cipher updated upon output of a key stream, the non-linear processor comprising program execution circuitry operative to store and execute a computer program to form functional components including:
   a non-linear substitution unit that subjects the input value to non-linear substitution processing;
   a plurality of internal registers that store output values from the non-linear substitution unit;
   a mask processing unit that is provided at an input end of each of the plurality of internal registers and carries out an exclusive-OR operation of a random number generated from part of values stored in the feedback shift register and the output value of the non-linear substitution unit to mask the output value of the non-linear substitution unit; and
   an unmasking unit that is provided at an output end of each of the plurality of internal registers and carries out an exclusive-OR operation of the random number and the value stored in each of the plurality of internal registers to unmask the value stored in the internal register; wherein
   the plurality of internal registers are connected via the non-linear substitution unit, and
   the non-linear substitution unit carries out the non-linear substitution processing while at least using the value stored in the internal register as the input value.

2. The non-linear processor according to claim 1, wherein the random number is generated from, among the values stored in the feedback shift register, a value for which randomness is ensured by update of the feedback shift register upon output of the key stream.

3. The non-linear processor according to claim 1, wherein the random number is generated by adding part of the values stored in the feedback shift register.

4. The non-linear processor according to claim 1, wherein the feedback shift register includes a 5-level-configuration first feedback shift register and an 11-level-configuration second feedback shift register; and
   the random number is generated by adding values stored in a second level and a third level of the first feedback register and values stored in a fourth level and a tenth level of the second feedback register.

5. A stream-cipher encrypting device comprising:
   a feedback shift register maintaining an internal state of a stream cipher initialized based on a secret key and an initial vector or an internal state of the stream cipher updated upon output of a key stream;
   a non-linear processor that subjects an input value from the feedback shift register to non-linear processing to output a key stream;
   an initialization processing unit that initializes the internal state based on a secret key and an initial vector and maintains the initialized state in the feedback shift register;

an internal-state updating unit that updates the internal state upon output of the key stream and maintains the updated internal state in the feedback shift register; and an encrypting unit that carries out an exclusive-OR operation of the key stream output from the non-linear processor and a plaintext input from outside to output an encrypted text, wherein the non-linear processor comprises program execution circuitry operative to store and execute a computer program to form functional components including:

a non-linear substitution unit that subjects the input value to non-linear substitution processing;

a plurality of internal registers that store output values from the non-linear substitution unit;

a mask processing unit that is provided at an input end of each of the plurality of internal registers and carries out an exclusive-OR operation of a random number generated from part of values stored in the feedback shift register and the output value of the non-linear substitution unit to mask the output value of the non-linear substitution unit; and an unmasking unit that is provided at an output end of each of the plurality of internal registers and carries out an exclusive-OR operation of the random number and the value stored in each of the plurality of internal registers to unmask the value stored in the internal register;

wherein the plurality of internal registers are connected via the non-linear substitution unit, and wherein the non-linear substitution unit carries out the non-linear substitution processing while at least using the value stored in the internal register as the input value.

6. A stream-cipher decrypting device comprising:

a feedback shift register maintaining an internal state of a stream cipher initialized based on a secret key and an initial vector or an internal state of the stream cipher updated upon output of a key stream;

a non-linear processor that subjects an input value from the feedback shift register to non-linear processing to output a key stream;

an initialization processing unit that initializes the internal state based on a secret key and an initial vector and maintains the initialized state in the feedback shift register;

an internal-state updating unit that updates the internal state upon output of the key stream and maintains the updated internal state in the feedback shift register; and a decrypting unit that carries out an exclusive-OR operation of the key stream output from the non-linear processor and an encrypted text input from outside to output a plaintext, wherein the non-linear processor comprises program execution circuitry operative to store and execute a computer program to form functional components including:

a non-linear substitution unit that subjects the input value to non-linear substitution processing;

a plurality of internal registers that store output values from the non-linear substitution unit;

a mask processing unit that is provided at an input end of each of the plurality of internal registers and carries out an exclusive-OR operation of a random number generated from part of values stored in the feedback shift register and the output value of the non-linear substitution unit to mask the output value of the non-linear substitution unit; and an unmasking unit that is provided at an output end of each of the plurality of internal registers and carries out an exclusive-OR operation of the random number and the value stored in each of the plurality of internal registers to unmask the value stored in the internal register;

wherein the plurality of internal registers are connected via the non-linear substitution unit, and wherein the non-linear substitution unit carries out the non-linear substitution processing while at least using the value stored in the internal register as the input value.

7. A mask processing method of masking data in a non-linear processor that subjects an input value from a feedback shift register to non-linear processing to output a key stream, the feedback shift register maintaining an internal state of a stream cipher initialized based on a secret key and an initial vector or an internal state of the stream cipher updated upon output of a key stream; wherein the non-linear processor comprises an internal register, a non-linear substitution unit that subjects the input value to the non-linear substitution processing, a mask processing unit, and an unmasking unit; and the mask processing method includes:

a first step of carrying out an exclusive-OR operation of an output value of the non-linear substitution unit and a random number generated from part of values stored in the feedback shift register by the mask processing unit to mask the output value of the non-linear substitution unit;

a second step of storing the output value of the non-linear substitution unit masked in the first step by the internal register; and a third step of carrying out an exclusive-OR operation of the value stored in the internal register in the second step and the random number by the unmasking unit to unmask the value stored in the internal register.

8. Apparatus comprising a non-transitory computer readable storage medium having a computer program encoded thereon and stored in a computer readable format, the computer program being executable by a computer to cause the computer to execute a mask processing method of masking data in a non-linear processor that subjects an input value from a feedback shift register to non-linear processing to output a key stream, the feedback shift register maintaining an internal state of a stream cipher initialized based on a secret key and an initial vector or an internal state of the stream cipher updated upon output of a key stream; wherein the non-linear processor comprises an internal register, a non-linear substitution unit that subjects the input value to the non-linear substitution processing, a mask processing unit, and an unmasking unit; and the apparatus comprising a non-transitory computer readable storage medium having a computer program encoded thereon and stored in a computer readable format, the computer program being executable by a computer to cause the computer to execute:

a first step of carrying out an exclusive-OR operation of an output value of the non-linear substitution unit and a random number generated from part of values stored in the feedback shift register by the mask processing unit to mask the output value of the non-linear substitution unit;

a second step of storing the output value of the non-linear substitution unit masked in the first step by the internal register; and a third step of carrying out an exclusive-OR operation of the value stored in the internal register in the second step and the random number by the unmasking unit to unmask the value stored in the internal register.

* * * * *